(12) United States Patent
Han

(10) Patent No.: US 7,090,608 B2
(45) Date of Patent: Aug. 15, 2006

(54) WHEEL TRANSMISSION

(75) Inventor: Seung-Woo Han, Incheon (KR)

(73) Assignee: Wooyoung Hydraulics Co., Ltd., Incheon (KR)

( * ) Notice: Subject to any disclaimer, the term of this patent is extended or adjusted under 35 U.S.C. 154(b) by 0 days.

(21) Appl. No.: 10/478,258

(22) PCT Filed: Dec. 14, 2001

(86) PCT No.: PCT/KR01/02166

§ 371 (c)(1),
(2), (4) Date: Jan. 21, 2004

(87) PCT Pub. No.: WO03/022615

PCT Pub. Date: Mar. 20, 2003

(65) Prior Publication Data

US 2004/0116234 A1    Jun. 17, 2004

(30) Foreign Application Priority Data

Sep. 11, 2001    (KR) ................ 2001-56004

(51) Int. Cl.
*F16H 31/00* (2006.01)
(52) U.S. Cl. .............. 475/144; 475/116; 475/269; 475/311; 475/312; 475/316; 192/48.4; 192/48.6; 192/48.92; 192/46; 192/54.5; 192/221.1; 192/219.2
(58) Field of Classification Search ............. 475/116, 475/144, 146, 269, 311, 312, 314, 316; 192/48.4, 192/48.6, 48.92, 46, 54.5, 221.1, 219.2, 219.3, 192/219.4; 180/6.2, 6.66
See application file for complete search history.

(56) References Cited

U.S. PATENT DOCUMENTS

| | | | | |
|---|---|---|---|---|
| 3,039,327 A * | 6/1962 | Breting | ............. | 475/19 |
| 3,137,182 A * | 6/1964 | Berchtold | ............. | 475/22 |
| 3,937,105 A | 2/1976 | Arai et al. | | |
| 4,788,886 A | 12/1988 | Nussbaumer et al. | | |
| 5,186,693 A * | 2/1993 | Nishida et al. | ............. | 475/148 |
| 5,267,917 A * | 12/1993 | Kadotani et al. | ............. | 475/318 |
| 5,569,109 A * | 10/1996 | Okada | ............. | 475/28 |
| 5,725,079 A * | 3/1998 | Matsumoto et al. | ........ | 192/52.5 |
| 5,853,344 A * | 12/1998 | Tsukamoto et al. | ......... | 475/269 |
| 5,918,715 A * | 7/1999 | Ruth et al. | ............. | 192/46 |
| 5,951,433 A * | 9/1999 | Tsukamoto et al. | ......... | 475/281 |
| 6,309,322 B1 * | 10/2001 | Shim | ............. | 475/269 |

* cited by examiner

*Primary Examiner*—Rodney H. Bonck
*Assistant Examiner*—David D. Le
(74) *Attorney, Agent, or Firm*—Sherr & Nourse, PLLC

(57) ABSTRACT

A wheel transmission for a heavy construction vehicle, which can be applied to specially-equipped vehicles as well as heavy construction vehicles such as a forklift truck and a mechanical shovel. The wheel transmission (200) is intended to drive a pair of right and left wheels independently, and includes a planetary gear assembly (210), a change clutch part (230), a one-way clutch part (300), and a brake part (270) housed in an axle hub at which opposite ends of a drive axle shaft are located, turning force from an engine of a heavy construction vehicle being transferred to the drive axle shaft through a torque converter, a driving shaft, a final reduction gear and a differential gear.

24 Claims, 25 Drawing Sheets

Background Art

Background Art

Background Art

Background Art

Background Art

Background Art

Background Art

WHEEL TRANSMISSION

TECHNICAL FIELD

The present invention relates to a wheel transmission for a heavy construction vehicle which can be applied to specially-equipped vehicles as well as heavy construction vehicles such as a forklift truck and a mechanical shovel, and more particularly to a wheel transmission for a heavy construction vehicle which is adapted to be mounted on an axle hub to enable shifting to a forward drive stage and a reverse stage and is provided with shifting a clutch part, a brake part and the like, and which is intended to separately control forward and reverse drives of both drive wheels to allow turning in place.

BACKGROUND ART

In general, heavy construction vehicles use hydraulic motors or engines as their power source, and are classified into wheel type and crawler type according to means of mobility.

Although a heavy construction vehicle is not intended to travel at a high speed and does not require multistage shifting, the heavy construction vehicle has essential concerns to be addressed such as reduction of noise and vibration transferred from an engine and minimization of radius of gyration.

FIG. 1 is a view showing a configuration of a conventional drivetrain, which is applied to a forklift truck as a kind of heavy construction vehicle. In such a conventional forklift truck, a transmission 1 is installed at its center region. A clutch 6 is disposed between an input shaft 2 and an output shaft 3 of the transmission 1, which is intended to cause turning force from the input shaft 2 to be cut off and to be transferred to the output shaft 3.

The clutch 6 is connected to a torque converter 5 which serves to augment driving force transferred from an engine 4 placed at a rear part of the forklift truck. The turning force transferred to the output shaft 3 of the transmission 1 is transferred to an axle shaft 9 through a final reduction gear 7 and a differential gear 8 to rotate wheels. An axle hub includes a drum brake or a disc brake (not shown) therein to brake on the moving vehicle.

However, the above-mentioned conventional transmission applied to a heavy construction vehicle such as a forklift truck has disadvantages in that there is a long distance between an engine and an axle shaft because the transmission together with a clutch are placed between a torque converter and an axle shaft, much of vibration and noise generated from the engine is transferred to a driver's seat located at the center of the heavy vehicle through the transmission, and it is difficult for a user to operate the heavy vehicle at a narrow site because the heavy vehicle must be configured to be long due to the transmission.

Since such a heavy construction vehicle, which is equipped with a transmission having a conventional configuration, turns in the same way as that of a usual passenger vehicle or a transport vehicle, the radius of gyration "R" of the heavy vehicle is relatively large, as shown in FIG. 2. Hence, it is difficult to operate at narrow site, and also its operating behavior is relatively slow.

Furthermore, a conventional heavy construction vehicle rearwardly moves when the vehicle begins to move from a stopped state on a slope way (when gear shifting is carried out). Since a heavy construction vehicle equipped with a transmission having a conventional configuration includes a large-sized housing adapted to receive a clutch and a transmission, there are drawbacks in that it is impossible to freely design the center part of the vehicle and it is possible to achieve a satisfactory reduction ratio only where a final reduction gear intended to finally reduce an engine speed is designed to have a large size.

To solve the above problems, the present applicant filed Korean Patent Application No. 2000–46795 titled "a wheel transmission for a heavy construction vehicle" which is adapted to be mounted on axle hubs of both front or rear wheels to prevent generation of noise from an engine and transfer of vibration to a transmission and is intended to drive the both wheels independently to minimize a turning radius of the vehicle. Furthermore, the wheel transmission in the application is intended to improve braking performance while integrally constituting a brake with a clutch, and is adapted to be compact to freely design an engine mounting and an axle mounting.

The wheel transmission is characterized in that in a wheel transmission for driving a pair of right and left wheels independently which includes a planetary gear assembly, a first change clutch part, a second change clutch part and a one-way clutch part housed in an axle hub at which opposite ends of an axle shaft are located, turning force from an engine of a heavy construction vehicle being transferred to the axle shaft through a torque converter, a driving shaft, a final reduction gear and a differential gear, the planetary gear assembly includes a sun gear formed at an end of the axle shaft, and a plurality of planetary gears engaged with the sun gear and connected to one another via a carrier, the planetary gears being engaged with ring gears, the first change clutch part includes a cylinder disposed in the axle hub positioned at a location corresponding to a radius of the ring gear in which the cylinder is provided therein with a brake piston and a service piston engaged with each other to be moved in the long direction of the axle hub by supply of hydraulic oil, the brake piston is elastically supported by a disc spring, the service piston is coupled to a reaction plate, and an inner surface of the axle hub and an outer surface of the ring gear are provided with a brake plate and a frictional plate engaged with each other in a spline manner to press the reaction plate, the second change clutch part includes a cylinder disposed in the axle hub positioned at a location corresponding to a radius of the carrier in which the cylinder is provided therein with a brake piston and a service piston engaged with each other to be moved in the long direction of the axle hub by supply of hydraulic oil, the brake piston is elastically supported by a disc spring, the service piston is coupled to a reaction plate, and an inner surface of the axle hub and an outer surface of the carrier are provided with a brake plate and a frictional plate engaged with each other in a spline manner to press the reaction plate, and the one-way clutch part includes a first one-way clutch through which an output shaft of the ring gear is connected to the wheel to cause the wheel to be rotated only in a reverse direction, and a second one-way clutch through which an output shaft of the carrier is connected to the wheel to cause the wheel to be rotated only in a forward drive direction.

Moreover, this wheel transmission is characterized in that the torque converter is provided at an output shaft with a usual auxiliary clutch so as to cause turning force of an engine to be transferred to a drive shaft or to be not transffered.

Therefore, according to the above patent application, since the wheel transmission is installed at wheel axle hubs of both wheels of front wheels or rear wheels, a distance between an engine and an axle shaft can be reduced, vibration and noise generated from an engine can be intercepted, a heavy construction vehicle can be operated at a narrow site by reduction in a full length of an equipment, it is possible to minimize a turning radius of a heavy construction vehicle, the wheel transmission serves as a service brake (a brake actuated in a running state), a parking brake and a clutch, and it is possible to improve braking performance and durability by adopting a wet oiling brake.

Furthermore, since a wheel is stably locked by the one-way clutch, it is possible to prevent a heavy construction vehicle from moving rearward when being started up on a slope way.

In addition, it is possible to broaden design flexibility of an engine mounting and an axle mounting by affording extra space to the center portion of a heavy construction vehicle, since speed of an engine is finally decelerated by a gear ration of a planetary gear assembly, it is possible to achieve a sufficient gear ratio even though a final reduction gear is reduced in size, and braking operation is automatically achieved by restoring force of a disc spring when an engine is stopped and this hydraulic pressure is released.

The present applicant also filed a provisional patent application titled "a wheel transmission for a heavy construction vehicle"(Korean Patent Application No. 2001–11280) on the basis of the wheel transmission (Korean Patent Application No. 2000–46795), in which a sun gear is divided into a forward drive sun gear and a reverse sun gear, a ring gear is held on a housing, and wheels are independently rotated in forward drive direction or reverse direction by a drive of a carrier due to rotation of the forward drive sun gear and the reverse sun gear.

FIGS. 3 to 5b show a configuration of the wheel transmission (Korean Patent Application No. 2001–11280). More specifically, FIG. 3 is a cross-sectional view of the wheel transmission, FIG. 4a is an enlarged cross-sectional view of "A" portion of FIG. 3 in a forward drive travel, and FIG. 4b shows a planetary gear assembly in forward drive travel.

FIG. 5a is an enlarged cross-sectional view of "A" portion of FIG. 3 in a reverse travel, and FIG. 5b is a view showing a planetary gear assembly of FIG. 5a in a reverse travel.

As shown in the drawings, the wheel transmission (Korean Patent Application No. 2001–11280) is characterized in that in a wheel transmission 100 for driving a pair of right and left wheels 102 independently, which includes a planetary gear assembly 110, a first change clutch part 130 and a second change clutch part 140 housed in an axle hub 104 at which opposite ends of an axle shaft 108 are located, turning force from an engine being transferred to the axle shaft 108 through a torque converter, a driving shaft, a final reduction gear and a differential gear, the planetary gear assembly 110 includes a pair of forward drive sun gear 114 and reverse sun gear 116 with the axle shaft 108 and a bearing 112 disposed therebetween in which the forward drive sun gear 114 is engaged with a plurality of first planetary gears 120, and the reverse sun gear 116 is engaged with a second planetary gear 122 with which a first planetary gear 120, the first planetary gear 120 being engaged with a ring gear 124 fixedly placed at an axle housing 106, the first change clutch part 130 includes a cylinder 132 disposed in the axle hub 104 positioned at a location corresponding to that of the forward drive sun gear 114 in which a forward drive piston 136 advances and comes into close contact with the forward drive sun gear 114 while compressing a return spring 138 by supply of hydraulic oil into the cylinder 132, and at the same time a clutch plate 135 disposed at the forward drive sun gear 114 comes into close contact with a frictional plate 137 provided at a first clutch pack 108a extended from the axle shaft 108 so as to engage the forward drive sun gear 114 to the axle shaft 108, and the second change clutch part 140 includes a cylinder 142 disposed in the axle hub 104 positioned at a location corresponding to that of the reverse sun gear 116 in which a reverse piston 146 advances and comes into close contact with the reverse sun gear 116 while compressing a return spring 148 by supply of hydraulic oil into the cylinder 142, and at the same time a clutch plate 145 disposed at the reverse sun gear 116 comes into close contact with frictional plates 147 provided at a second clutch pack 108b extended from the axles shaft 108 so as to engage the reverse sun gear 116 to the axle shaft 108.

DISCLOSURE OF THE INVENTION

The present invention relates to another improved wheel transmission of an improved wheel transmission (Korean Paten Application No. 2001–11280) developed on the basis of the above-mentioned wheel transmission (Korean Patent Application No. 2000–46795), and an object of the present invention is to provide a wheel transmission capable of achieving the same effect as that of a conventional wheel transmission although change clutch parts are disposed to one side in contrast to a conventional wheel transmission in which change clutch parts are separately provided to both sides.

In order to accomplish the above object, the present invention provides a wheel transmission for driving a pair of right and left wheels independently which includes a planetary gear assembly, a change clutch part, a brake part, and a one-way clutch part housed in an axle hub at which opposite ends of a drive axle shaft are located, turning force from an engine of a heavy construction vehicle being transferred to the drive axle shaft through a torque converter, a driving shaft, a final reduction gear and a differential gear, in which:

the planetary gear assembly comprises a pair of forward drive sun gear and a reverse sun gear rotatably coupled to a clutch shaft connected to the drive axle shaft, the forward drive sun gear being engaged with a plurality of first planetary gears and the reverse sun gear being engaged with a plurality of second planetary gears, in which the first planetary gears are engaged with an inner circumferential surface of a ring gear fixed to a housing;

the change clutch part comprises first clutch plates coupled to a cam clutch shaft rotatably mounted on the clutch shaft, first reaction plates attached to a first clutch pack extended from a drive axle shaft connected to an end of the clutch shaft which is adapted to be in close contact to or be separated from the first clutch plates and a second clutch plate attached to the first clutch pack in a direction opposite to the first reaction plates, a first cylinder part adapted to push the first reaction plates to be in close contact with or separated from the first clutch plates, second reaction plates attached to a second clutch pack connected to a reverse sun gear rotatably mounted on the clutch shaft which is adapted to be in close contact with or separated from the second clutch plate attached to the first clutch pack, and a second cylinder part adapted to push the second clutch plate to be in close contact with or separated from the second reaction plates;

the brake part comprises the brake plates attached to the second clutch pack to which the reverse sun gear is coupled such that the brake plates are positioned to face the second clutch plate, frictional plates fixedly attached to the housing to be in close contact with or separated from the brake plates, a service brake piston adapted to advance forwardly to cause the brake plate to frictionally contact with the frictional plate by supply of hydraulic oil when the brake pedal is pushed, and a parking brake piston adapted to maintain a position disconnected from the frictional plates by supply of hydraulic oil during running of the forklift truck and adapted to allow hydraulic oil to be discharged and the frictional plates to be in close contact with the brake plate by tension force of the spring when the vehicle is stopped; and the one-way clutch part comprises a cam clutch piston which is adapted to be moved back and forth by supply of hydraulic oil through the second oil channel of the second cylinder part, a one-way locker adapted to be slid by forward movement of the cam clutch piston, a return spring for providing restoring force to the one-way locker, an outer race placed at the clutch shaft and adapted to be in close contact with and separated from the one-way locker, and a cam clutch disposed between the outer race and the clutch shaft;

whereby the one-way locker and the outer race come into close contact with each other to actuate the cam clutch when the wheel transmission is in a forward drive stage or a neutral stage, and the cam clutch piston advances forwardly to allow the one-way locker to be separated from the outer race, thereby preventing the actuation of the cam clutch, when the wheel transmission is in a reverse stage.

The change clutch part comprises first clutch plates coupled to a cam clutch shaft rotatably mounted on the clutch shaft, first reaction plates attached to a clutch pack extended from a drive axle shaft connected to an end of the clutch shaft which is adapted to be in close contact with or be separated from the first clutch plates and a second clutch plate attached to the clutch pack in a direction opposite to and in parallel to the first reaction plates, a first cylinder part adapted to push the first reaction plates to be in close contact with or separated from the first clutch plates, second reaction plates adapted to be in close contact with or separated from the second clutch plate, and a second cylinder part adapted to push the second clutch plate to be in close contact with or separated from the second reaction plates.

The first cylinder part comprises a forward drive piston disposed in the vicinity of the first reaction plates, a return spring disposed between the forward drive piston and the cam clutch shaft, and a first oil channel for supplying hydraulic oil to the forward drive piston, and the second cylinder part comprises a reverse piston disposed in the vicinity of the second clutch plate, and a second oil channel for supplying hydraulic oil to the reverse piston.

The first and second oil channels are perforated through the drive axle shaft.

BRIEF DESCRIPTION OF THE DRAWINGS

FIGS. 11 to 13 are views showing the improved wheel transmission according to the present invention, wherein FIG. 11 is a view showing the wheel transmission when being stopped during forward driving, FIG. 12 is a view showing the wheel transmission when being stopped during rearward travel, FIG. 13 is a view showing the wheel transmission when a brake is actuated;

BEST MODE FOR CARRYING OUT THE INVENTION

This invention will be described in further detail by way of example with reference to the accompanying drawings.

Figure 1:
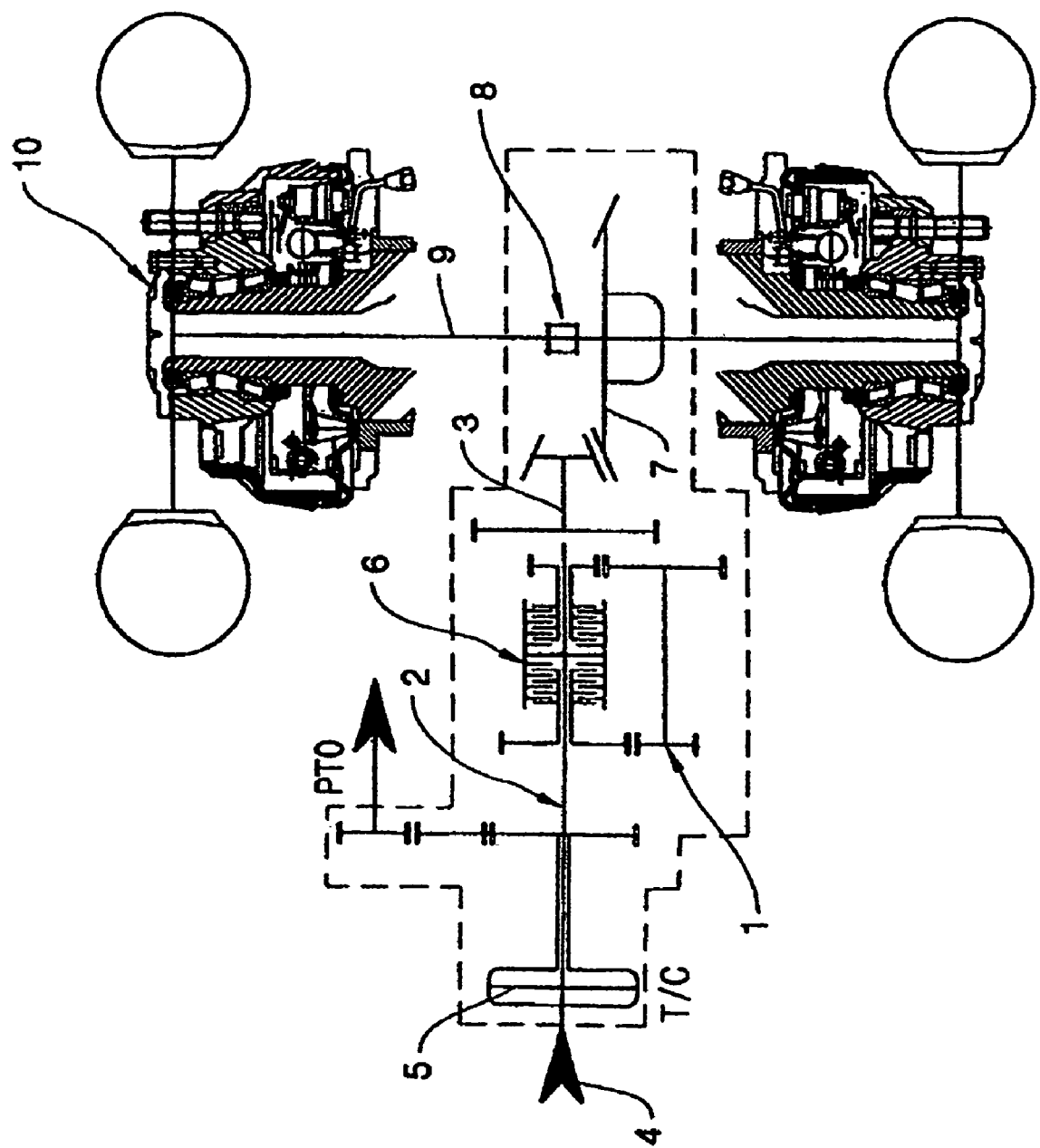
FIG. 1 is a view showing a configuration of a conventional drivetrain, which is applied to a forklift truck as a kind of heavy construction vehicle.
Figure 2:
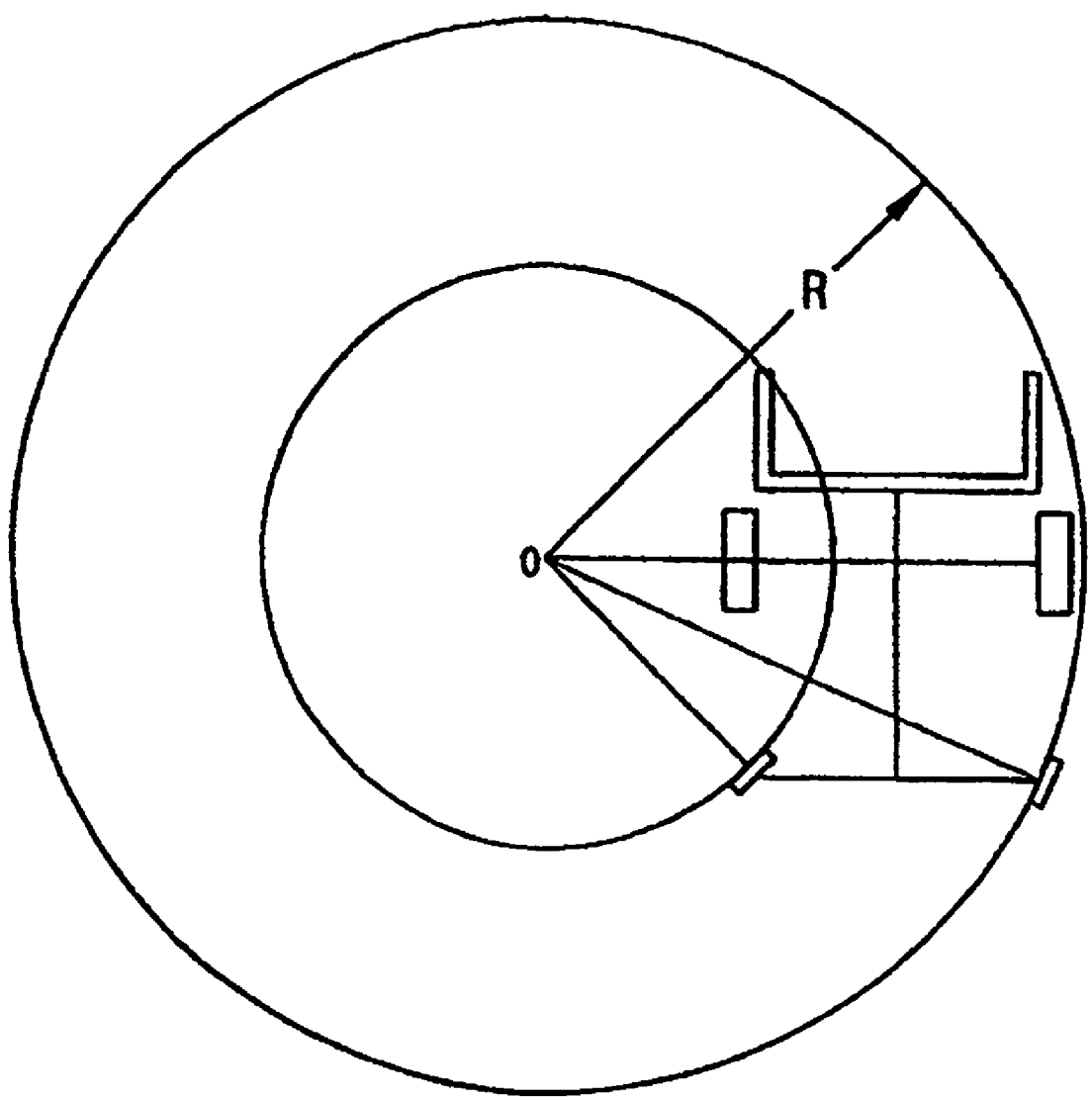
FIG. 2 is a view showing a turning radius of a forklift truck to which a wheel transmission according to the present invention is applied.
Figure 3:
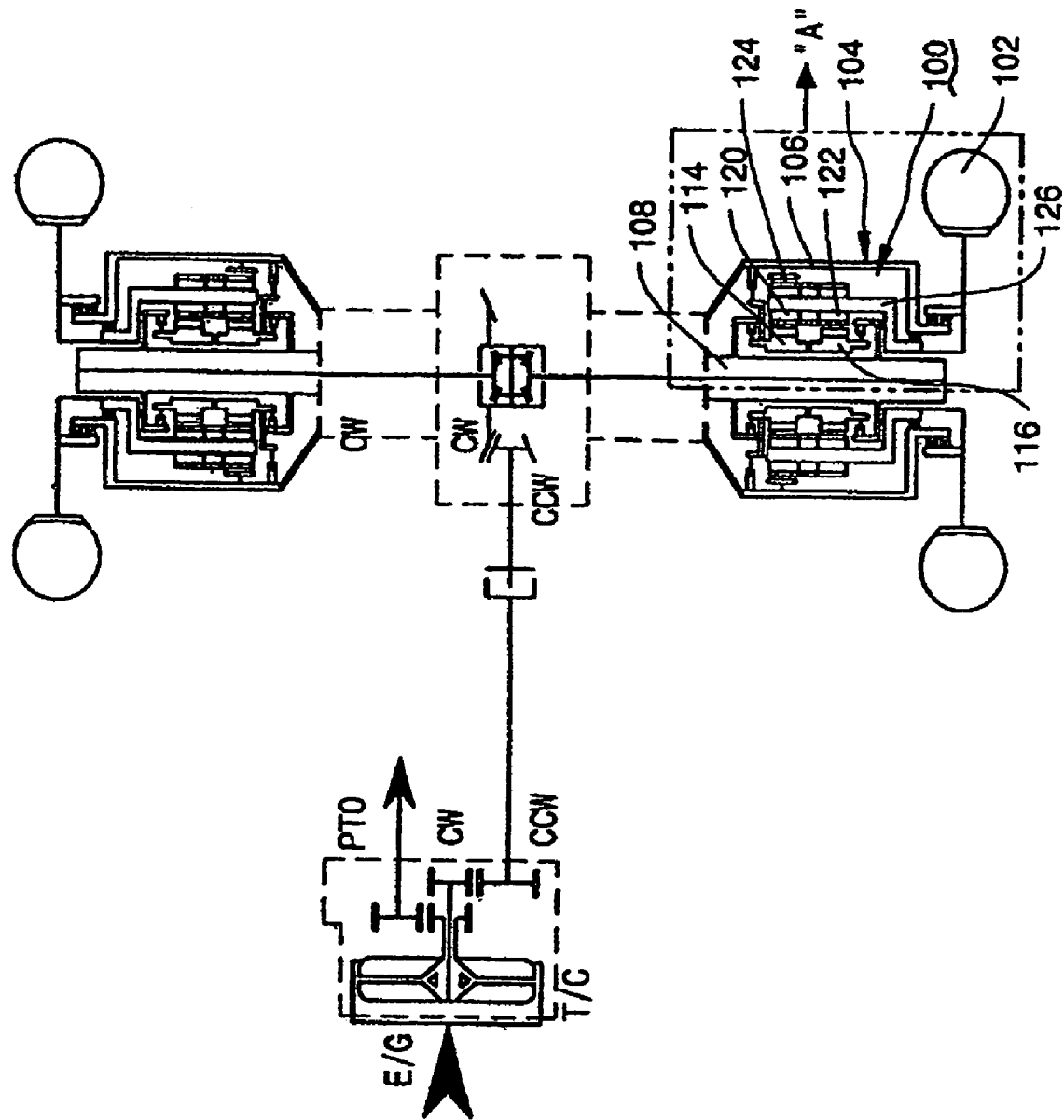
FIG. 3 is a cross-sectional view of the wheel transmission previously filed by the present applicant.
Figure 4A:
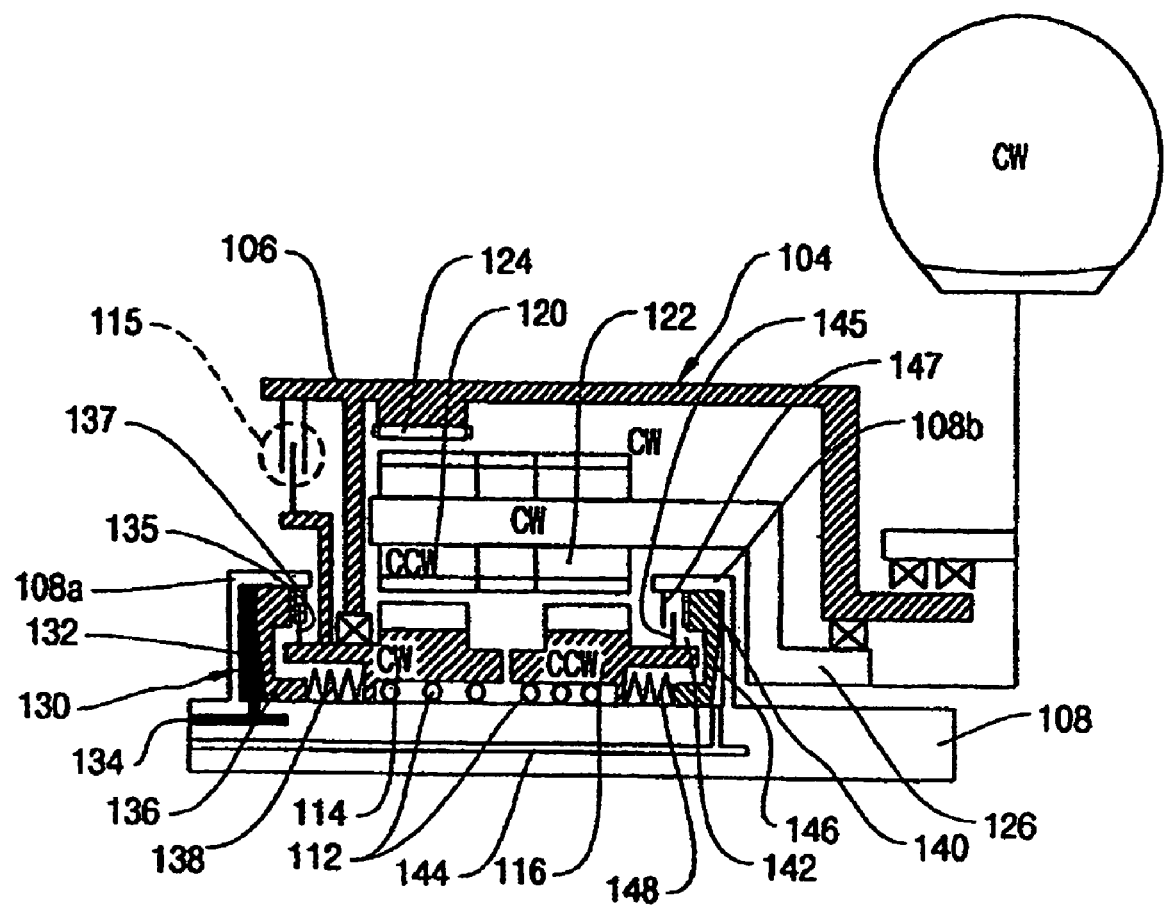
FIG. 4a is an enlarged view of "A" portion of FIG. 3 in a forward drive travel.
Figure 4B:
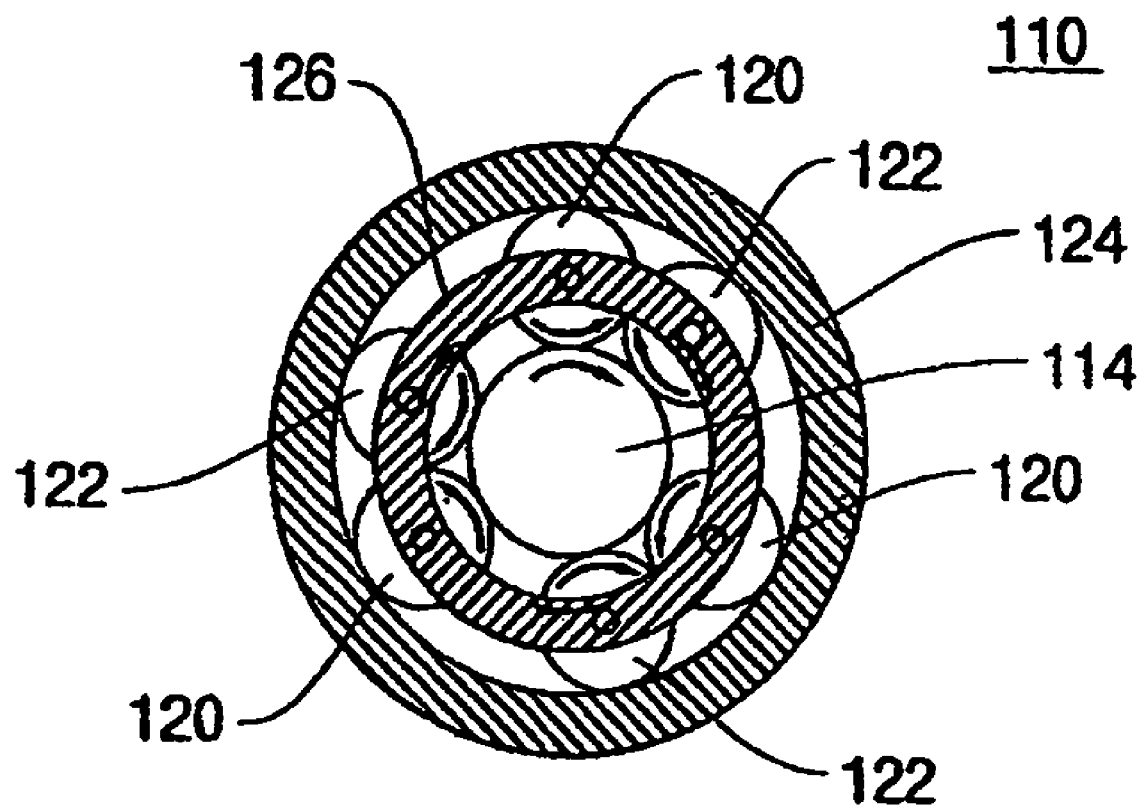
FIG. 4b is a view showing a planetary gear assembly of FIG. 3 in forward drive travel.
Figure 5A:
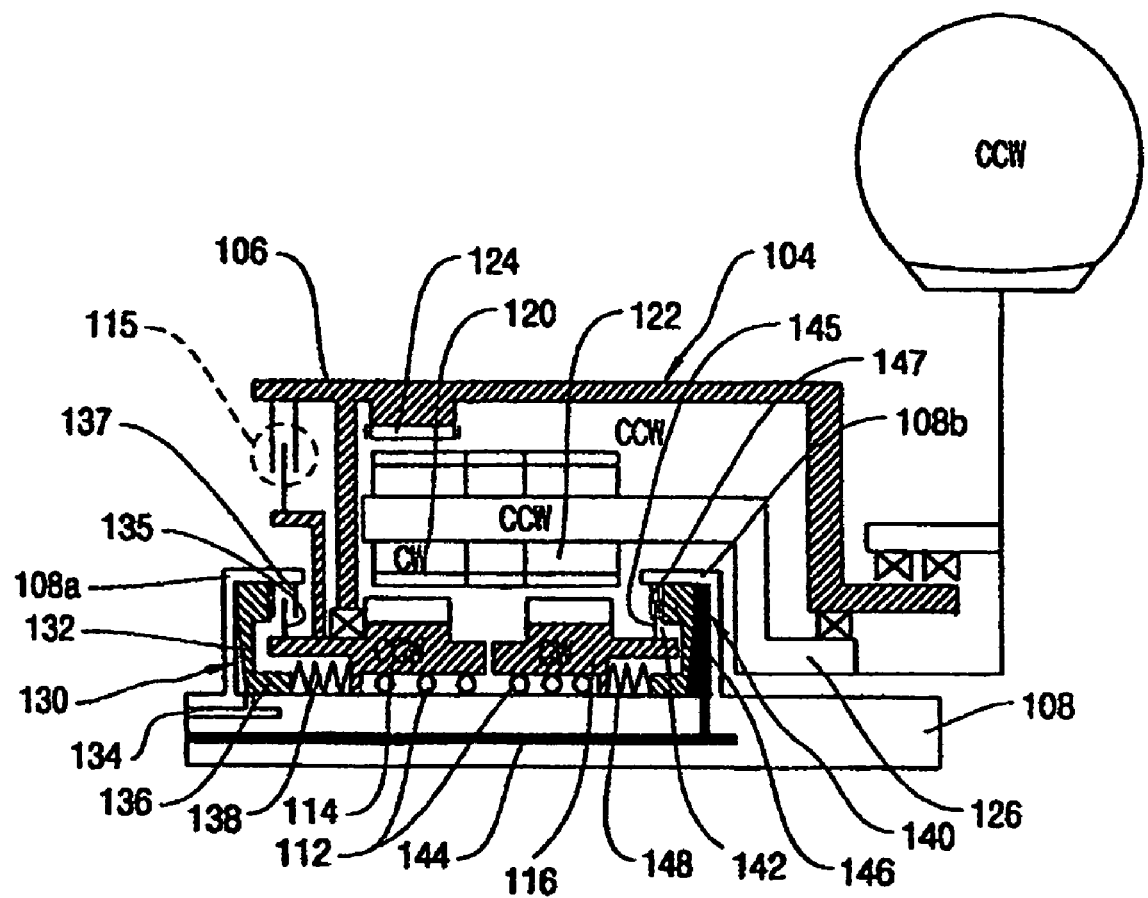
FIG. 5a is an enlarged view of "A" portion of FIG. 3 in a reverse travel.
Figure 5B:
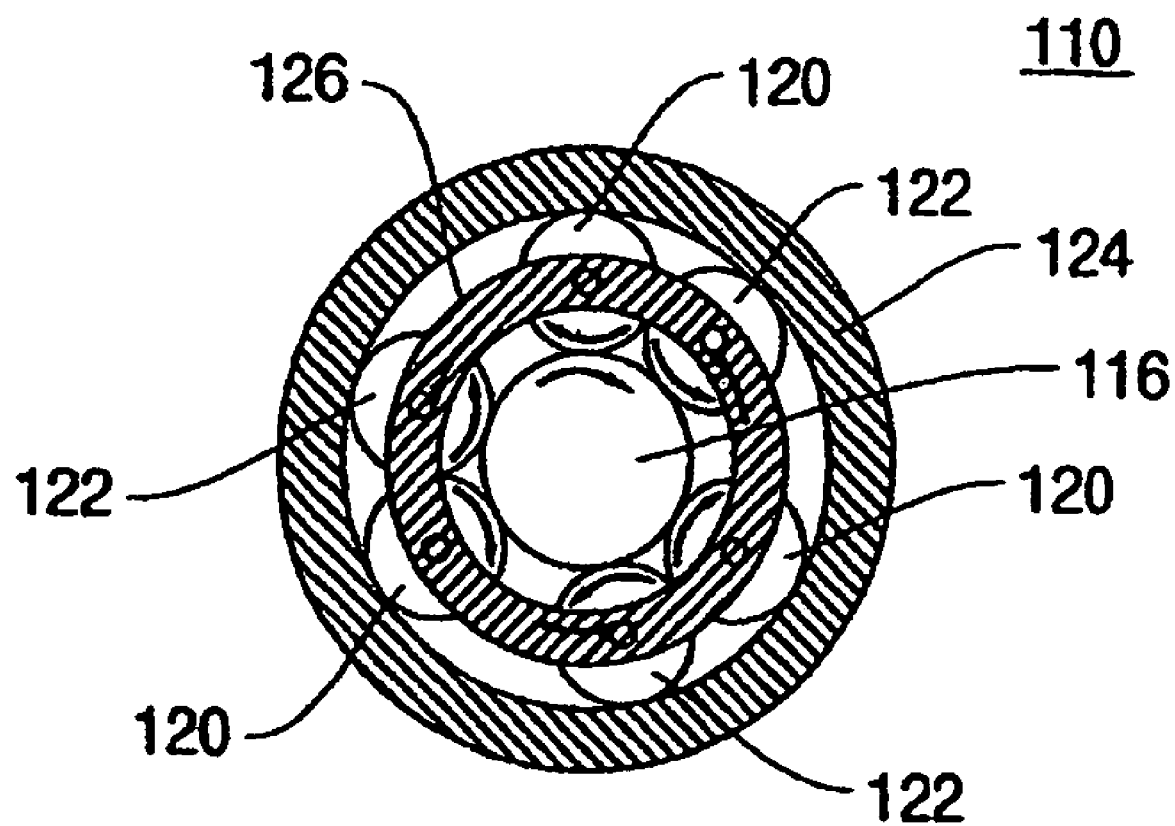
FIG. 5b is a view showing a planetary gear assembly of FIG. 5a in a reverse travel.
Figure 6:
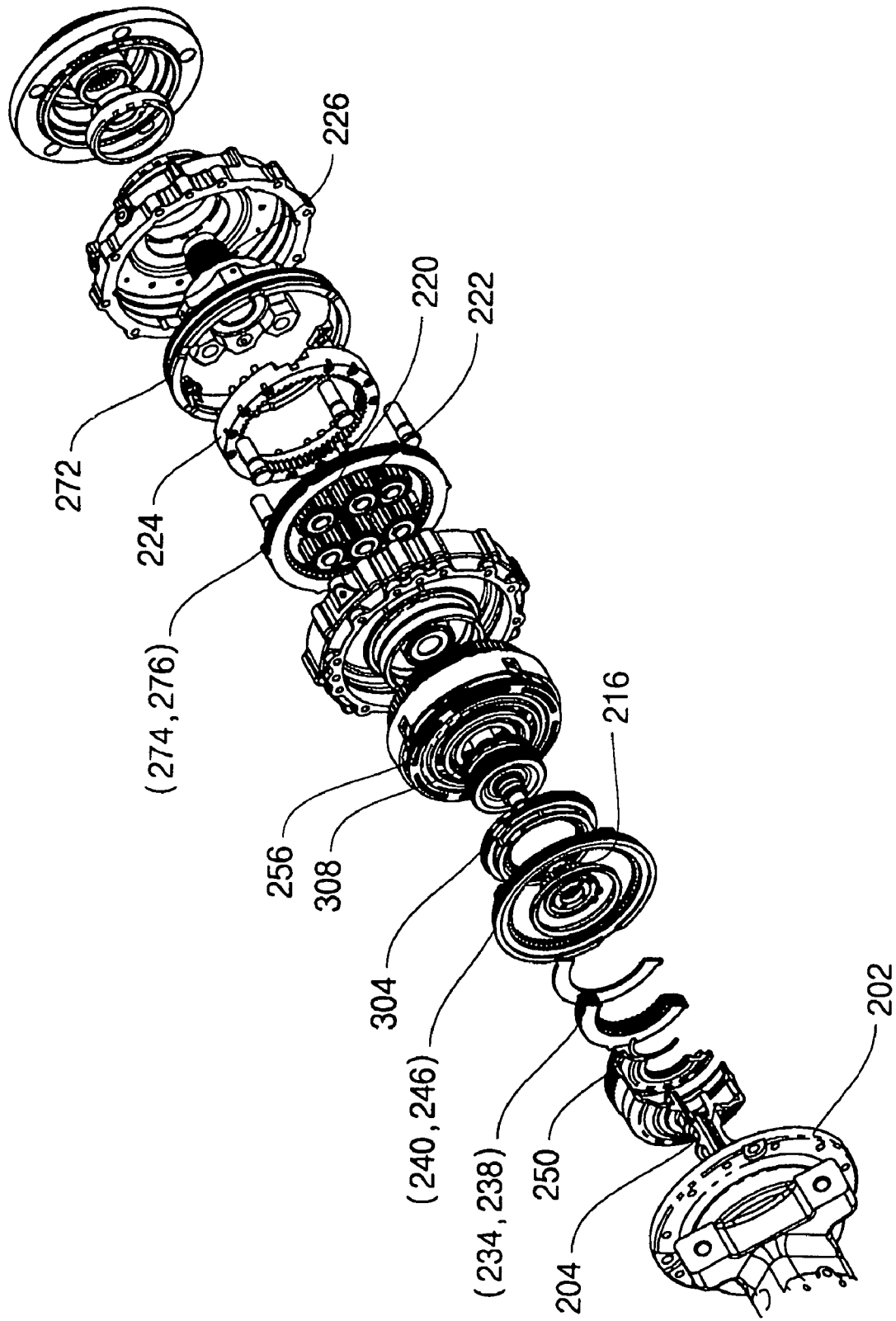
FIG. 6 is an exploded perspective view of an improved wheel transmission according to the present invention.
Figure 7:
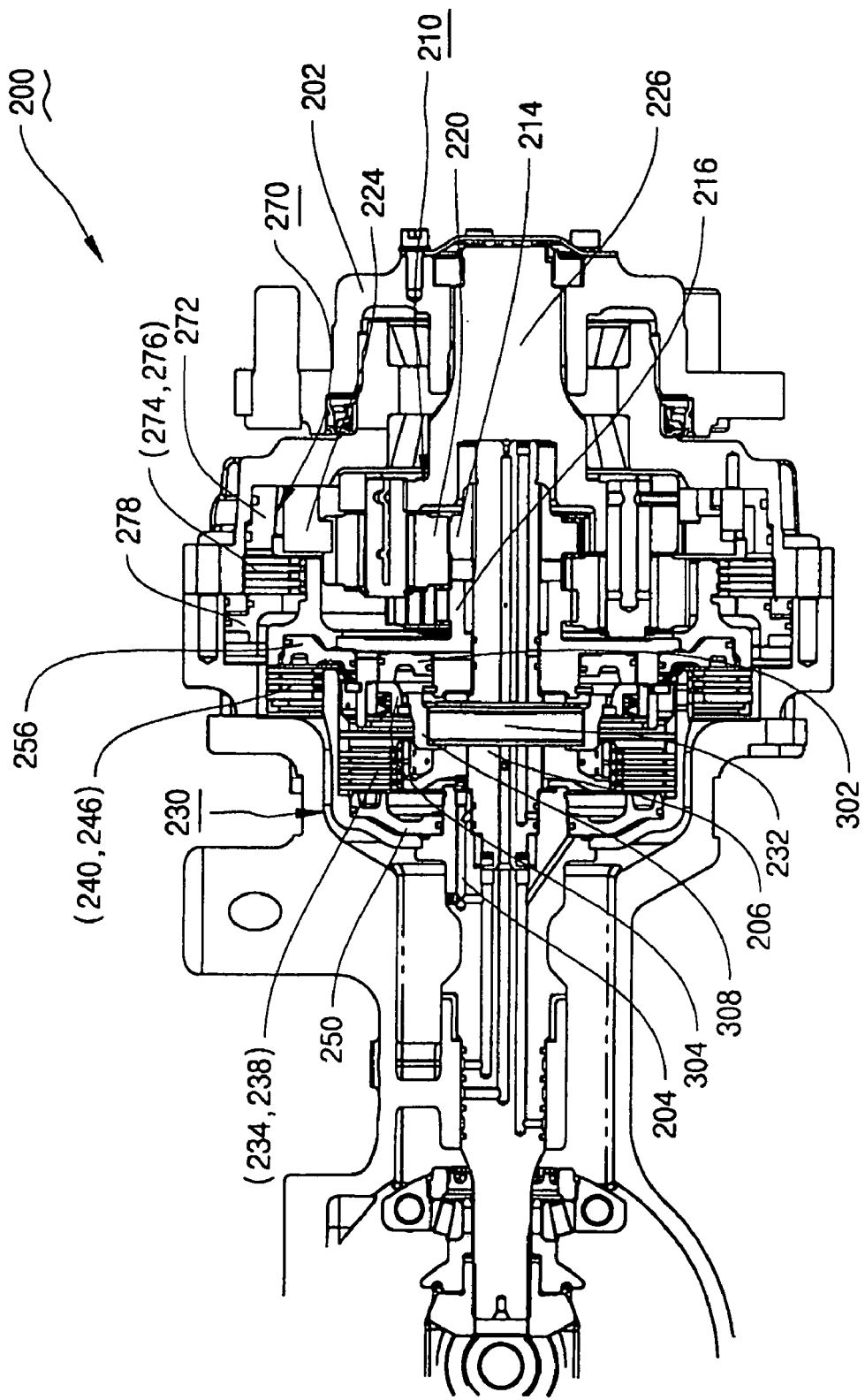
FIG. 7 is a cross-sectional view showing an assembled condition of components of FIG. 6.

FIG. 6 is an exploded perspective view of an improved wheel transmission according to the present invention, and FIG. 7 is a cross-sectional view showing an assembled condition of components of FIG. 6.

Figure 8:
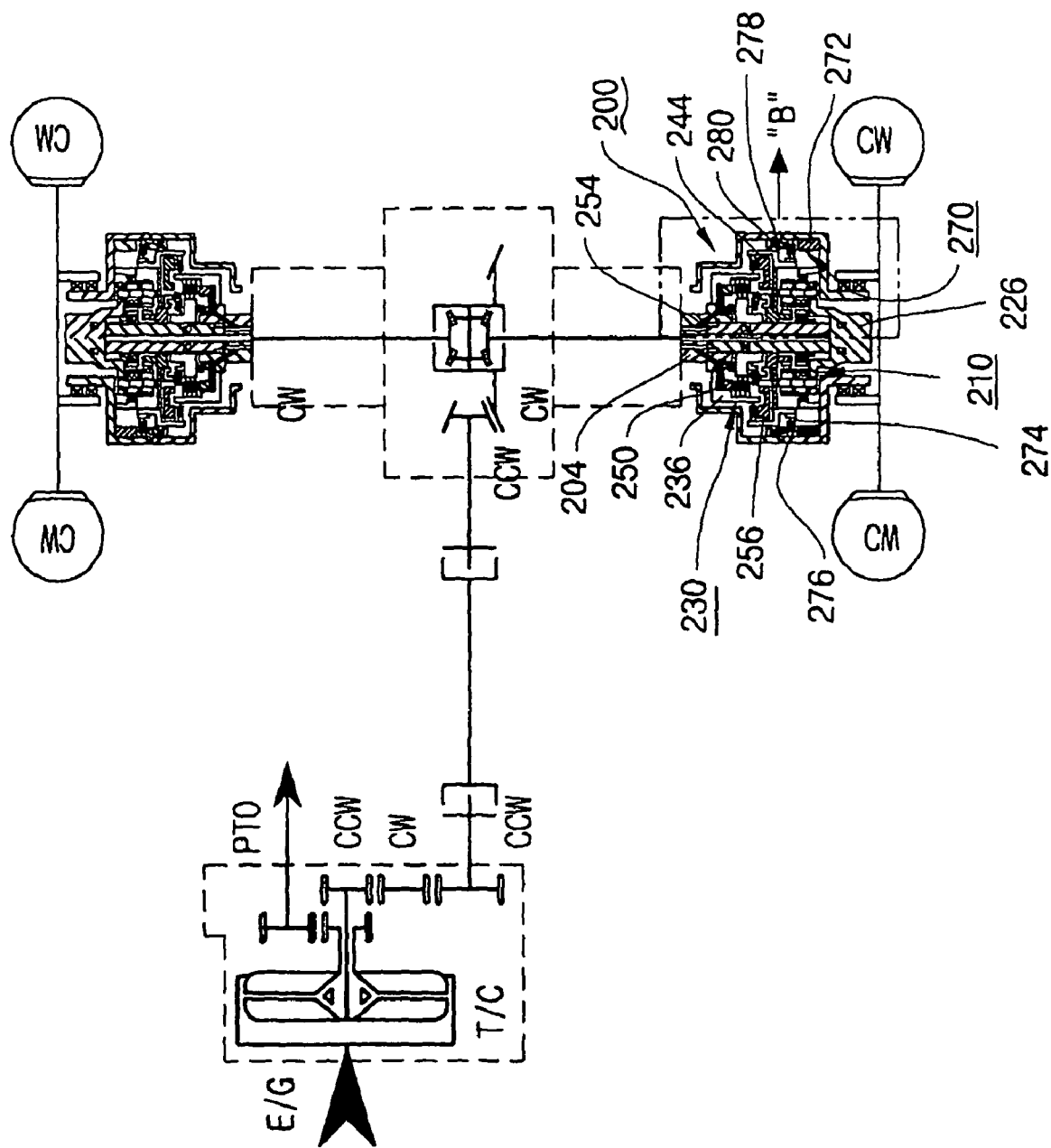
FIG. 8 is a cross-sectional view schematically showing an improved wheel transmission according to the present invention.
Figure 9A:
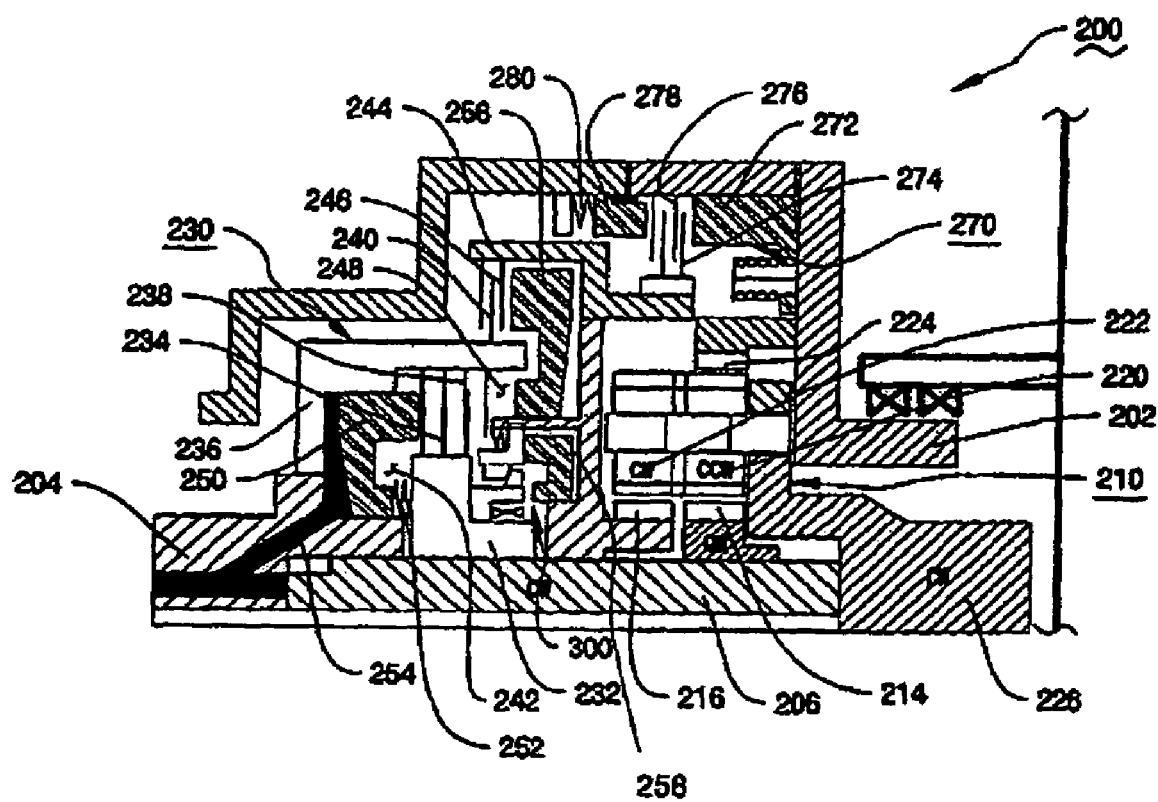
FIG. 9a is an enlarged view of "B" portion of FIG. 8 in a forward drive operation.
Figure 9B:
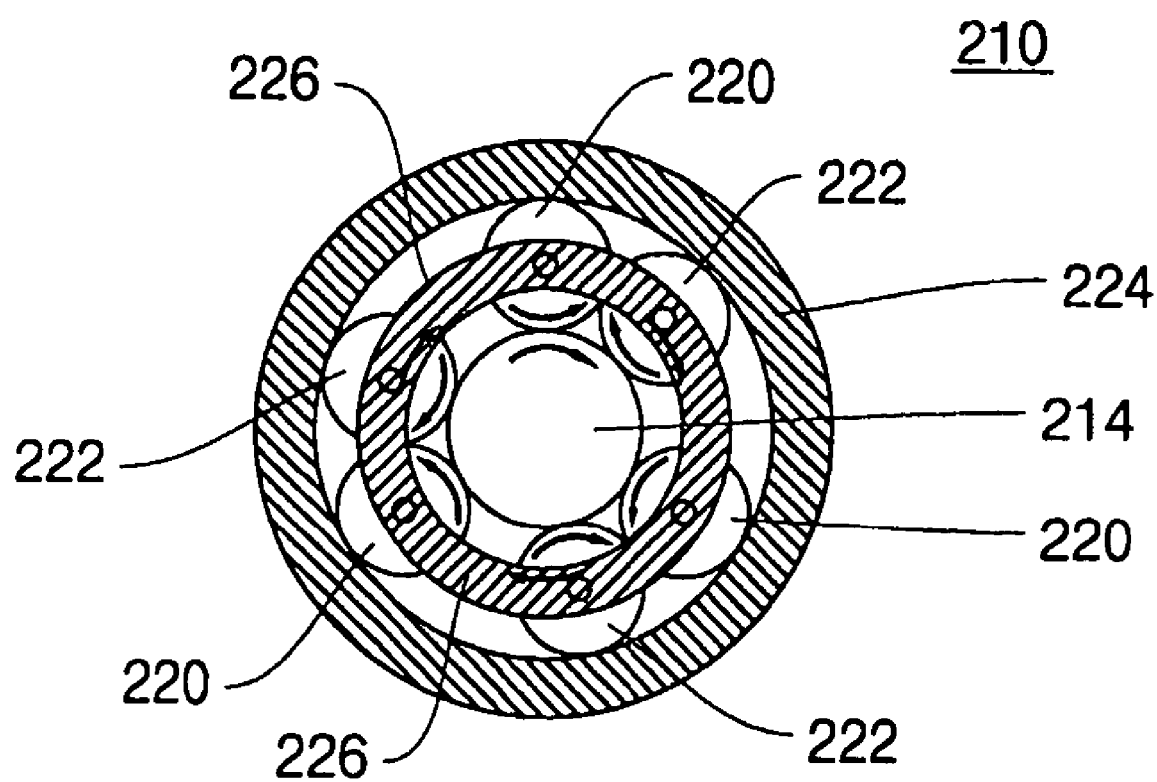
FIG. 9b is view of a planetary gear assembly of the wheel transmission according to the present invention in a forward drive operation.

FIG. 8 is a cross-sectional view showing an improved wheel transmission according to the present invention, FIG. 9a is an enlarged view of "B" portion of FIG. 8 in a forward drive operation, and FIG. 9b is view of a planetary gear assembly of the wheel transmission according to the present invention in a forward drive operation.

Figure 10A:
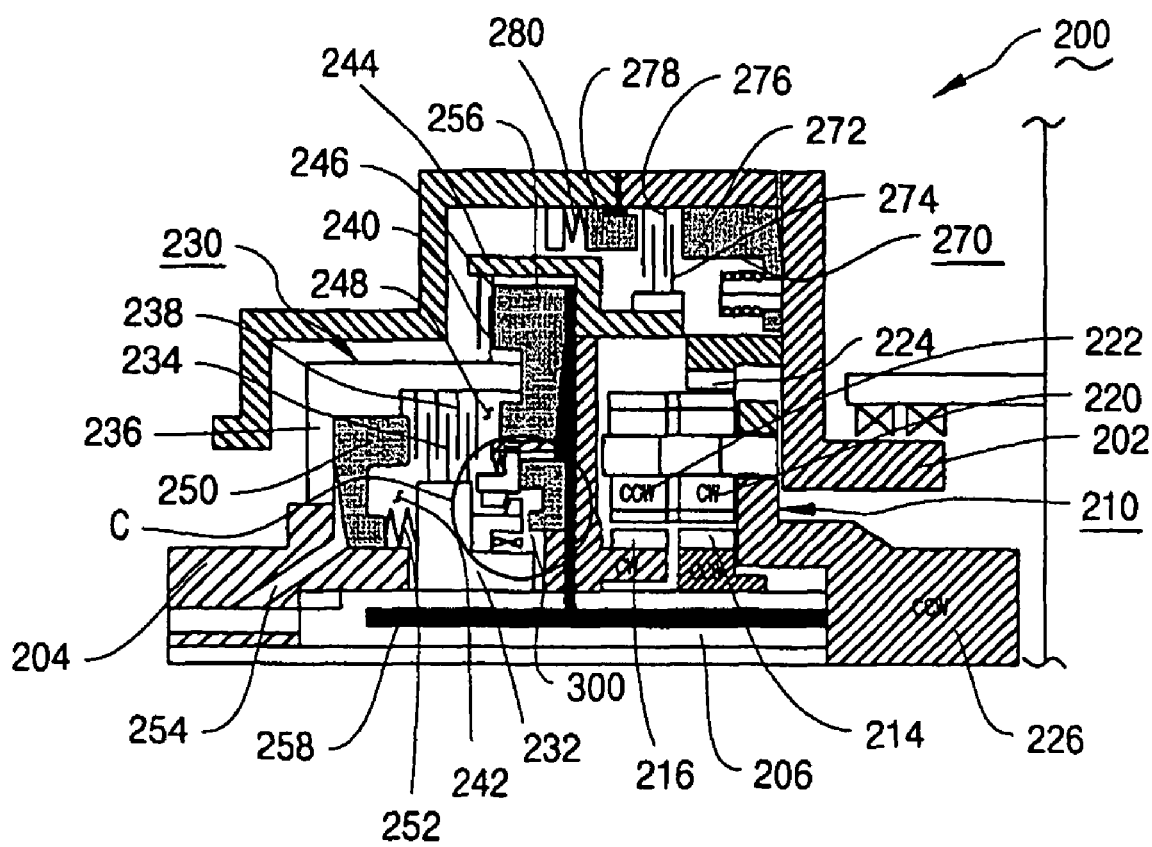
FIG. 10a is an enlarged view of "B" portion of FIG. 8 in a reverse travel.
Figure 10B:
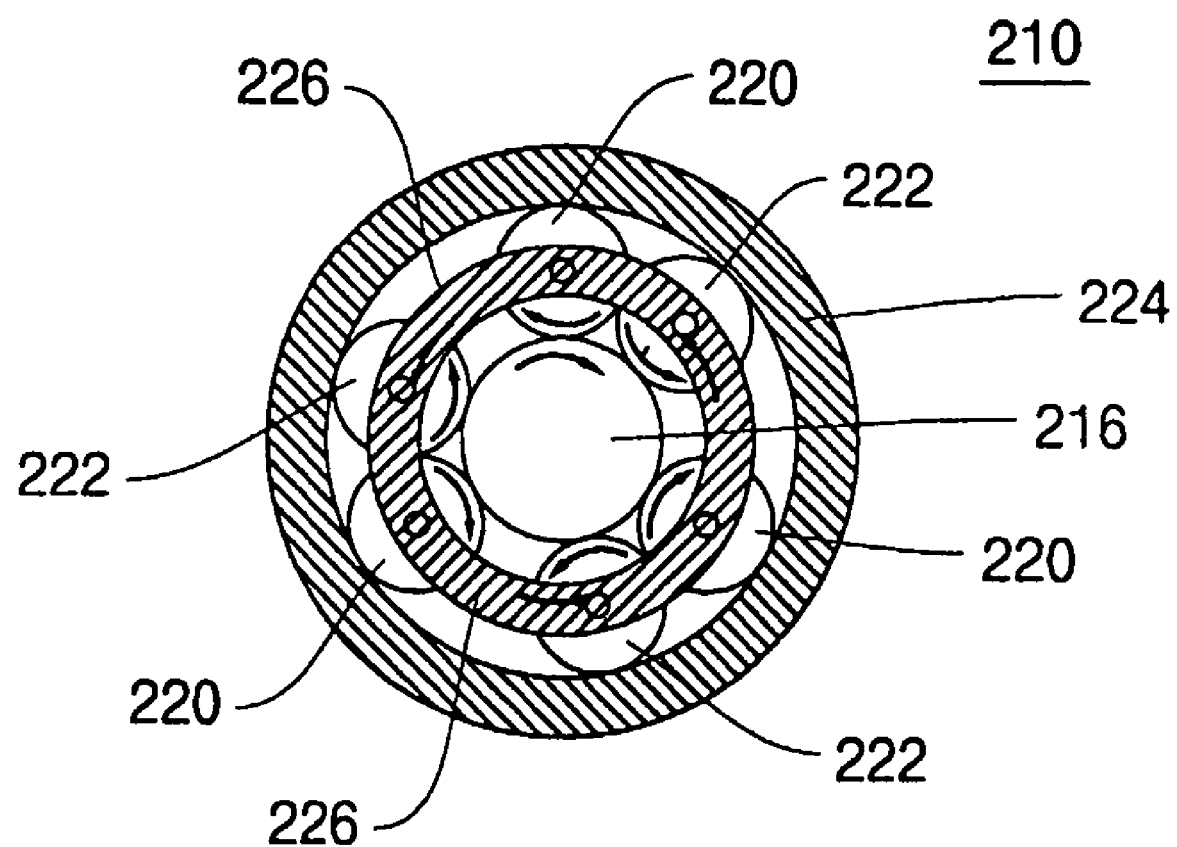
FIG. 10b is a view showing the planetary gear assembly according to the present invention in a reverse travel.
Figure 10C:
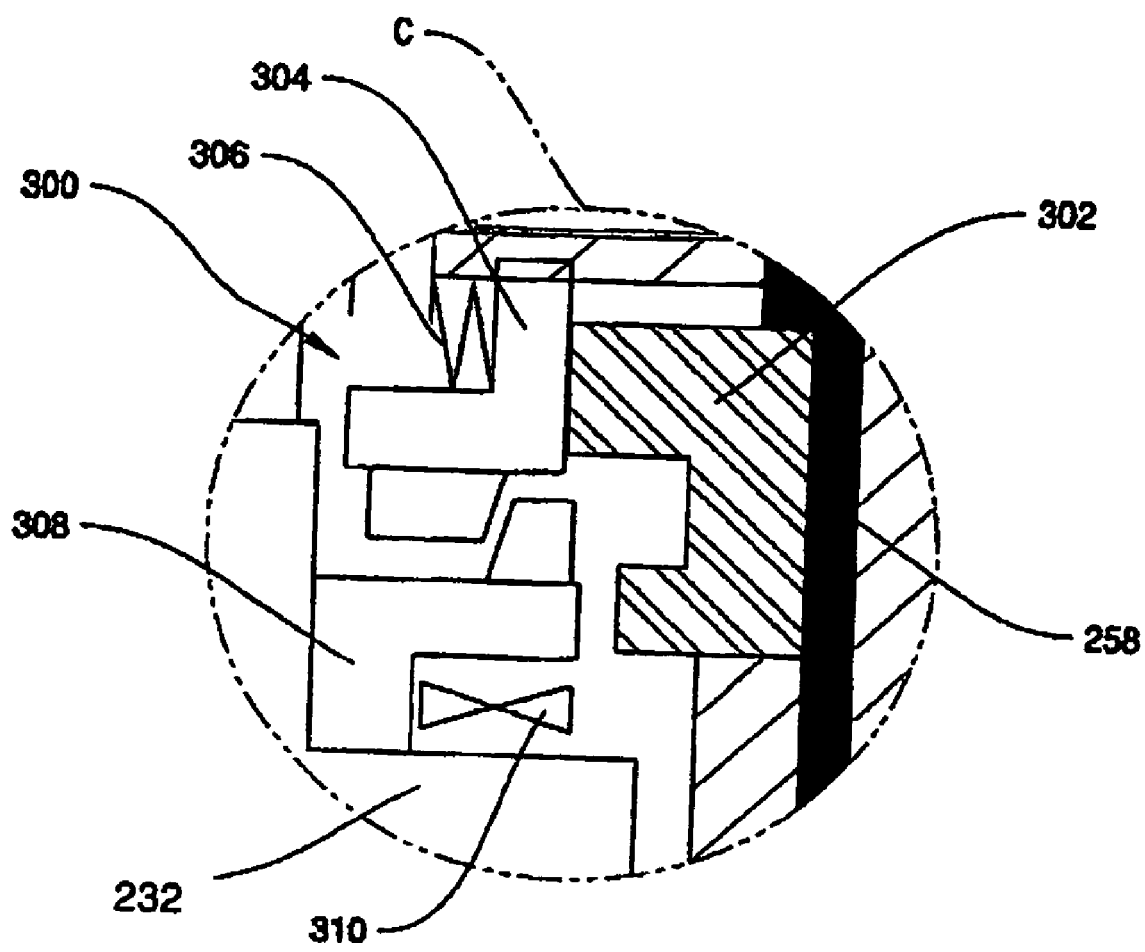
FIG. 10c is an enlarged view of "C" portion of FIG. 10a, which shows a one-way clutch.

FIG. 10a is an enlarged view of "B" portion of FIG. 8 in a reverse travel, FIG. 10b shows the planetary gear assembly according to the present invention in a reverse travel, and FIG. 10c is an enlarged view of "C" portion of FIG. 10a which shows a one-way clutch.

Figure 11:
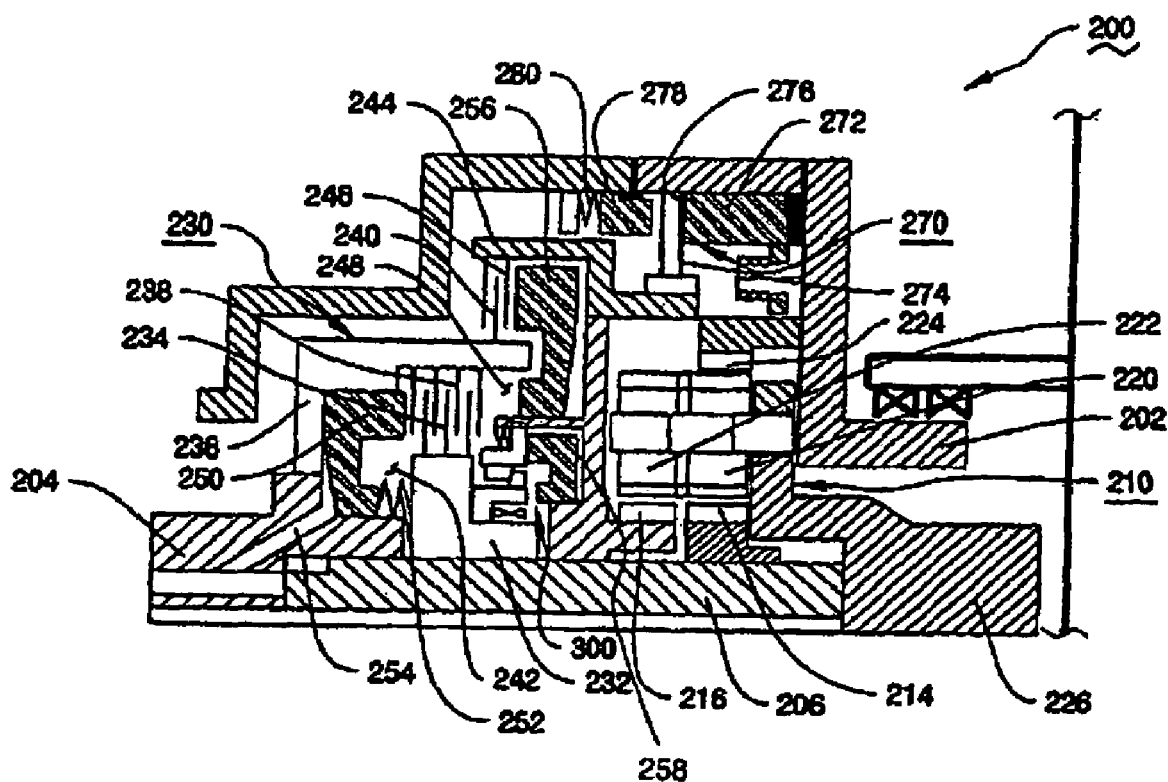
Figure 12:
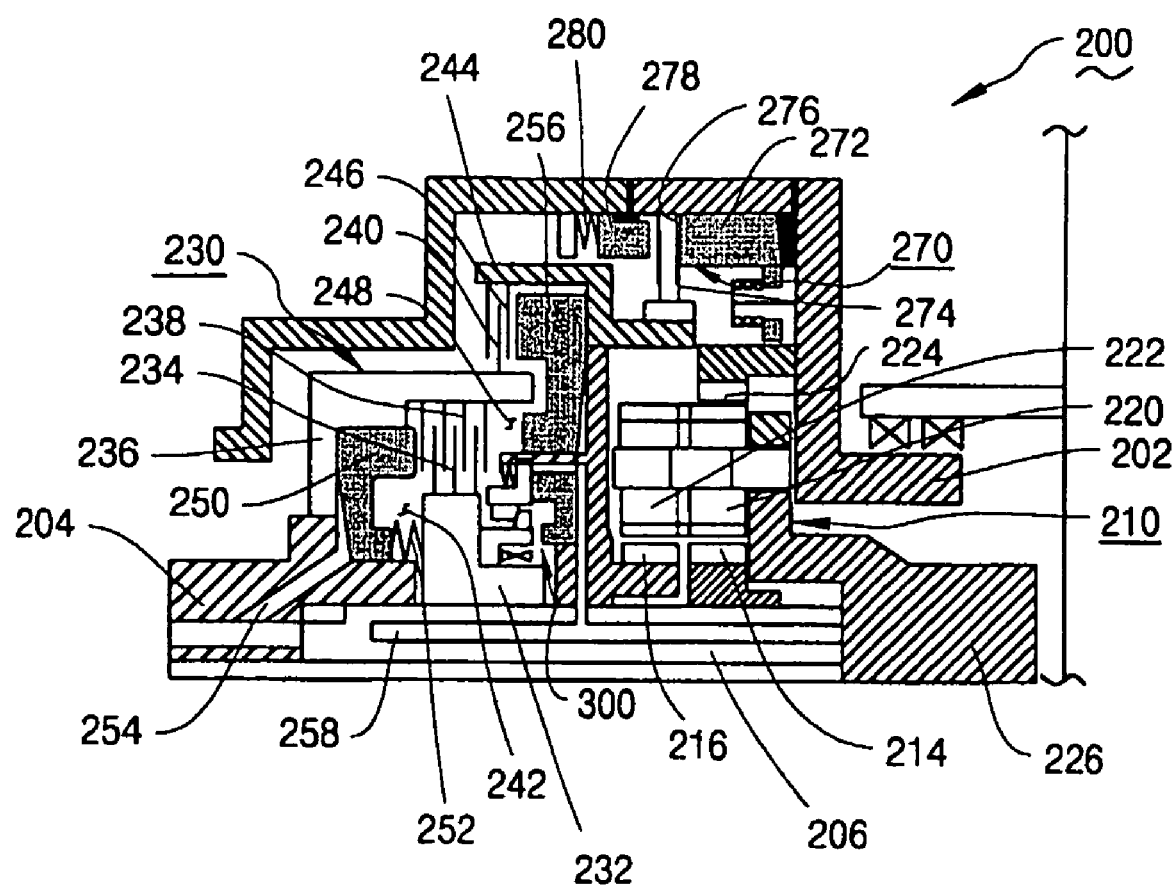
Figure 13:
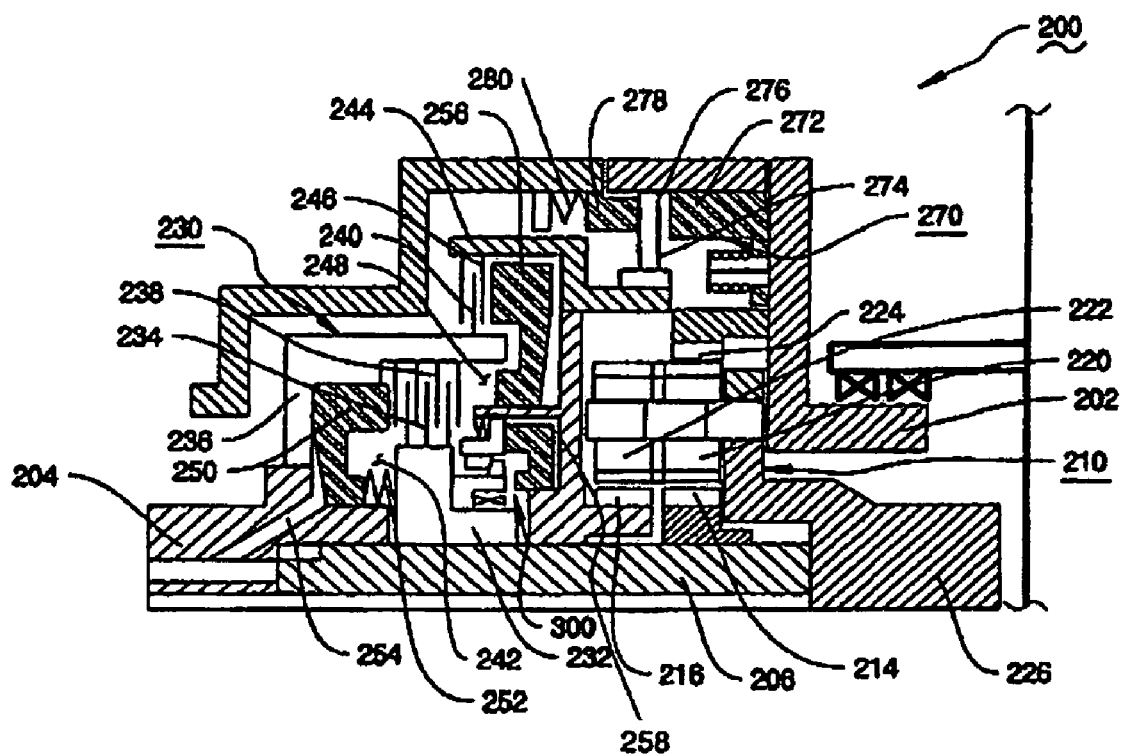
Figure 14:
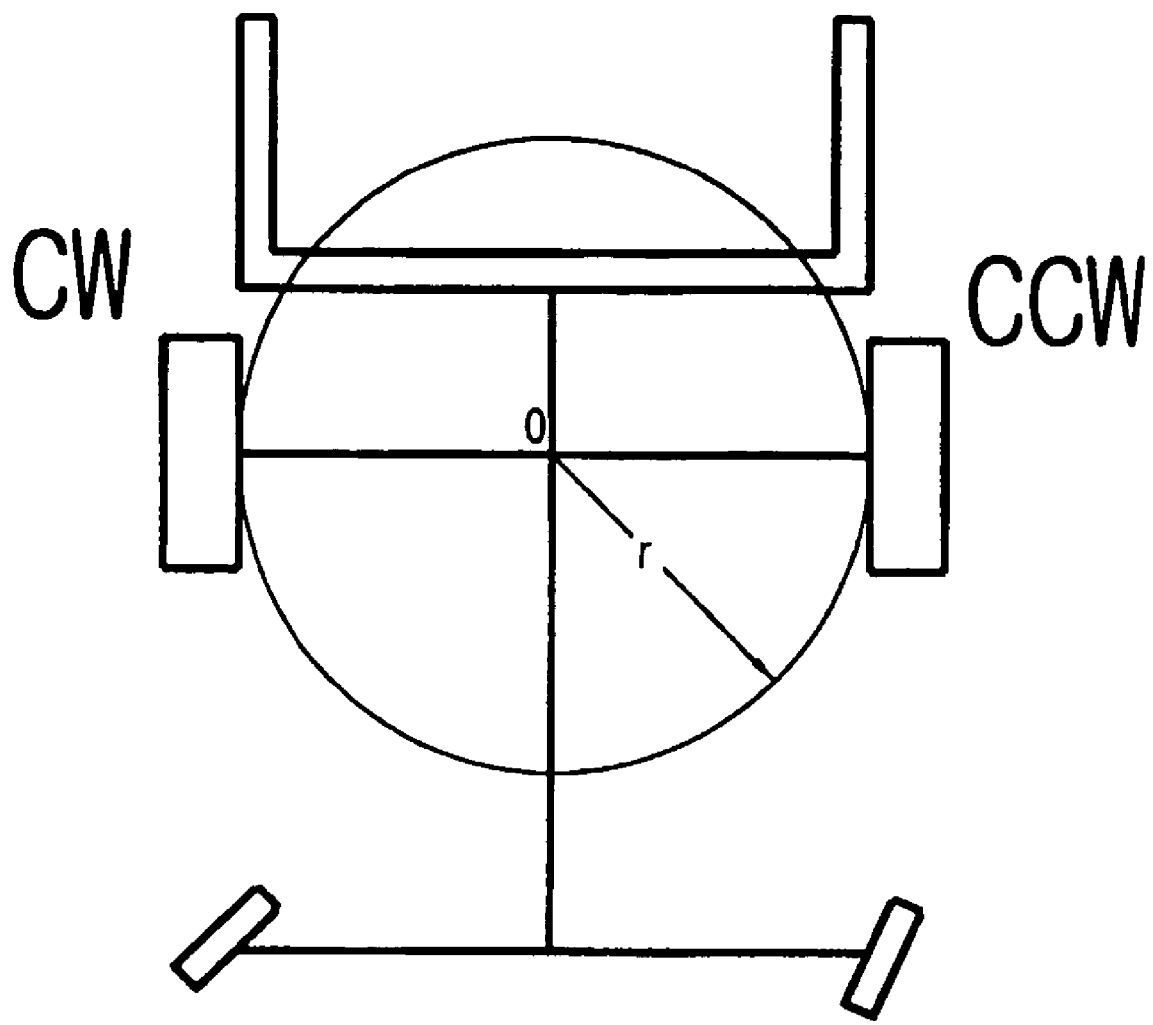
FIG. 14 is a view showing a radius of gyration of a forklift truck to which the improved wheel transmission according to the present invention is applied.

FIG. 11 is a view showing an improved wheel transmission according to the present invention when being stopped during forward driving, FIG. 12 is view showing the wheel transmission when being stopped during rearward travel, FIG. 13 is a view showing the wheel transmission when a brake is actuated, and FIG. 14 is a view showing a turning radius of a forklift truck to which the improved wheel transmission according to the present invention is applied.

As first shown in FIGS. 9a and 10a of the drawings, a front wheel (not shown) of a forklift truck which is a kind of heavy construction vehicle is provided in an axle hub with a planetary gear assembly 210, a change clutch part 230 and a brake part 270.

The planetary gear assembly 210 includes a forward drive sun gear 214 and a reverse sun gear 216 rotatably coupled to a clutch shaft 206, three first planetary gears 220 engaged with the forward drive sun gear 214 and three second planetary gears 222 engaged with the reverse sun gear 216 in which the first planetary gears 220 are engaged with an inner circumferential surface of a ring gear 224 fixed to a housing 202. By gear ratio of these gears, turning force from an engine can be finally reduced.

The change clutch part 230 comprises first clutch plates 234 coupled to a cam clutch shaft 232 rotatably mounted on the clutch shaft 206, first reaction plates 238 attached to a first clutch pack 236 extended from a drive axle shaft 204 connected to an end of the clutch shaft 206 which is adapted to be in close contact with or be separated from the first clutch plates 234 and a second clutch plate 240 attached to the first clutch pack 236 in a direction opposite to the first reaction plates 238, a first cylinder part 242 adapted to push the first reaction plates 238 to be in close contact with or separated from the first clutch plates 234, a second reaction plates 246 attached to a second clutch pack 244 connected to a reverse sun gear 216 rotatably mounted on the clutch shaft 206 which is adapted to be in close contact with or separated from the second clutch plate 240 attached to the first clutch pack 236, and a second cylinder part 248 adapted to push the second clutch plate 240 to be in close contact with or separated from the second reaction plates 246.

The first cylinder part 242 comprises a forward drive piston 250 disposed in the vicinity of the first reaction plates 238, a return spring 252 disposed between the forward drive piston 250 and the cam clutch shaft 232, and a first oil channel 254 for supplying hydraulic oil to the forward drive piston 250.

The second cylinder part 248 comprises a reverse piston 256 disposed in the vicinity of the second clutch plate 240, and a second oil channel 258 for supplying hydraulic oil to the reverse piston 256. Both the first and second oil channels 254 and 258 are perforated through the drive axle shaft 204.

Therefore, in a forklift truck equipped with the wheel transmission 200 constructed as described above, hydraulic oil is supplied to the first cylinder part 242.

Specifically, with supply of hydraulic oil through the first oil channel 254 of the first cylinder part 242, the forward drive piston 250 advances and thus pushes the first reaction plates 238 and the return spring 252 to cause the first reaction plates 238 and the first clutch plates 234 to be in close contact with each other, thereby engaging the cam clutch shaft 232, to which the first clutch plates 234 are attached, to the clutch shaft 206 and engaging the forward drive sun gear 214 to the clutch shaft 206.

As again shown in FIGS. 9a and 9b, the forward drive sun gear 214 engaged to the clutch shaft 206 is rotated clockwise (CW) by rotation of the drive axle shaft 204 and the clutch shaft 206. Subsequently, the first planetary gears 220 engaged with the forward drive sun gear 214 is rotated counterclockwise (CCW). At this point, the ring gear 224, an inner surface of which is engaged with the first planetary gears 220, is fixedly disposed to the housing 202. Since the first planetary gears 220 rotate on their axis and go around the sun gear 214, the second planetary gears 222, which are engaged with the first planetary gears 220, are rotated in an idle state clockwise (CW).

Accordingly, a carrier 226, to which the second planetary gears 222 are coupled, is also rotate clockwise (CW). By the turning force of the carrier 226, a wheel is driven forwardly.

As shown in FIG. 10c, the wheel transmission 200 according to the present invention is provided with a one-way clutch part 300 to cause the wheel transmission to be driven only in one direction. The one-way clutch part 300 includes a cam clutch piston 302 which is adapted to be moved back and forth by supply of hydraulic oil through the second oil channel 258 of the second cylinder part 248, a one-way locker 304 adapted to be slid by forward movement of the cam clutch piston 302, a return spring 306 for providing restoring force to the one-way locker 304, an outer race 308 placed at the clutch shaft 206 and adapted to be in close contact with and separated from the one-way locker 304, and a cam clutch 310 disposed between the outer race 308 and the clutch shaft 206.

Therefore, the one-way clutch part 300 constructed as described above is intended to achieve drive only in one direction at all times. Since the one-way locker 304 is always engaged with the outer race 308 by tension force of the return spring 306, it is possible to prevent the heavy vehicle from being moved rearwardly by actuation of the cam clutch 310.

In other words, with the actuation of the one-way clutch part 300, the heavy vehicle cannot accidentally move rearwardly when the vehicle begins to move on a slope way.

On the other hand, to move a heavy vehicle rearwardly, hydraulic oil is supplied into the second cylinder part 248.

To this end, an actuation of the one-way clutch part 300 must be first stopped, which regulates drive only in one direction.

Therefore, the cam clutch piston 302 advances forward and pushes the one-way locker 304 to release its close contact with the cam clutch 310 by supply of hydraulic oil through the second oil channel 258 of the second cylinder part 248, thereby allowing the actuation of the cam clutch 310 to be stopped.

At the same time, the reverse piston 256 advances forwardly and pushes the second clutch plate 240 to be in close contact with the second reaction plate 246 by supply of hydraulic oil through the second oil channel 258 of the second cylinder part 248. Therefore, the second clutch pack 244, to which the second reaction plates 246 are attached, causes the reverse sun gear 216 to be engaged to the clutch shaft 206.

As shown in FIGS. 10a and 10b, the reverse sun gear 216 engaged to the clutch shaft 206 is rotated clockwise (CW) by rotation of the drive axle shaft 204 and the clutch shaft 206, and the second planetary gear 222 engaged with the reverse sun gear 216 is rotated counterclockwise (CCW). At this point, the carrier 226 supporting the second planetary gears 222 is rotated counterclockwise (CCW). The turning force of the carrier 226 enables the wheel to be rotated in a reverse direction.

The forward drive sun gear 214 engaged with the first planetary gears 220 is rotated in an idle state.

When a brake pedal (not shown) is pushed so as to stop the forklift truck during forward driving, hydraulic oil in the first cylinder part 242 is discharged through the first oil channel 254 by a hydraulic controller (not shown), and the forward drive piston 250 is retracted to allow close contact between the first reaction plate 238 and the first clutch plate 234 to be released by resilience of the return spring 252 disposed between the forward drive piston 250 and the cam clutch shaft 232, as shown in FIG. 11. Accordingly, the cam clutch shaft 232 and the forward drive sun gear 214 are separated from the clutch shaft 206, and thus cannot be rotated due to the disconnection. Consequently, the rotations of the carrier 226 and thus the wheel are stopped. At the same time, a service brake piston 272 of the brake part 270 is supplied with hydraulic oil to be in frictional contact with brake plates 274, thereby achieving braking effect.

As in the above case, when a brake pedal is pushed so as to stop the forklift truck during rearward traveling, hydraulic oil in the second cylinder part 248 is discharged through the second oil channel 258 by a hydraulic controller, and the reverse piston 256 of the second cylinder part 248 is restored to allow close contact between the second clutch plate 240 and the second reaction plate 246 to be released, as shown in FIG. 12. Accordingly, the reverse sun gear 216 is separated from the clutch shaft 206, and thus cannot be rotated due to the disconnection. Consequently, the rotations of the carrier and thus the wheel are stopped. At the same time, the service brake piston 272 of the brake part 270 as described later is supplied with hydraulic oil to be in frictional contact with brake plates 274, thereby achieving braking effect.

The brake part 270 comprises the brake plates 274 attached to the second clutch pack 244 to which the reverse sun gear 216 is coupled such that the brake plates are positioned to face the second clutch plate 240, frictional plates 276 fixedly attached to the housing 202 to be in close contact with or separated from the brake plates 274, the service brake piston 272 adapted to advance forwardly to cause the brake plate 274 to be frictionally contact with the frictional plate 276 by supply of hydraulic oil when the brake pedal is pushed, and a parking brake piston 278 adapted to maintain a position disconnected from the frictional plates 276 by supply of hydraulic oil during running of the forklift truck and adapted to allow hydraulic oil to be discharged and the frictional plates 276 to be in close contact with the brake plate 274 by tension force of the spring 280 when running of the vehicle is stopped.

Consequently, when the brake pedal is pushed during forward or reverse drive, hydraulic oil is discharged through the first oil channel 254 and the second oil channel 258 of the first cylinder part 242 and the second cylinder part 248 while hydraulic oil is supplied to the service brake piston 272. Subsequently, the brake plate 274 comes into close contact with the frictional plate 276 by the service brake piston 272 and thus the sun gear 216 is engaged, thereby achieving braking.

In the drawings, reference numeral "280" designates a return spring for restoring the service brake piston 272, which has been advanced forwardly to cause the brake plate 274 to be in close contact with the frictional plates 276 by supply of hydraulic oil, to the original position when hydraulic oil is discharged.

When it is intended to actuate the parking brake in condition of the vehicle being stopped, running of the vehicle is turned off. With the turn off of running, hydraulic oil exerting pressure on the parking brake piston 278 is discharged, and the parking brake piston 278 pushes the frictional plate 276 to be in close contact with the brake plate 274 by tension force of the spring 280, thereby engaging the reverse sun gear 216 to hold the stopped state, as shown in FIG. 13.

Operation required to turn the forklift truck will now be described. First, when it is intended to turn the forklift truck leftwards, a left wheel transmission is shifted into a reverse stage and a right wheel transmission is shifted into a forward drive travel while the rear wheels are steered by a steering handle (not shown). Accordingly, the forklift truck is spin turned leftwards about its axle shaft at a minimum turning radius, as shown in FIG. 14.

In contrast, when it is intended to turn the forklift truck rightwards, a left wheel transmission is shifted into a forward drive stage and a right wheel transmission is shifted into a reverse stage while the rear wheels are steered by a steering handle (not shown). Accordingly, the forklift truck is spin turned rightwards about its axle shaft at a minimum turning radius, as shown in FIG. 14.

Figure 15:
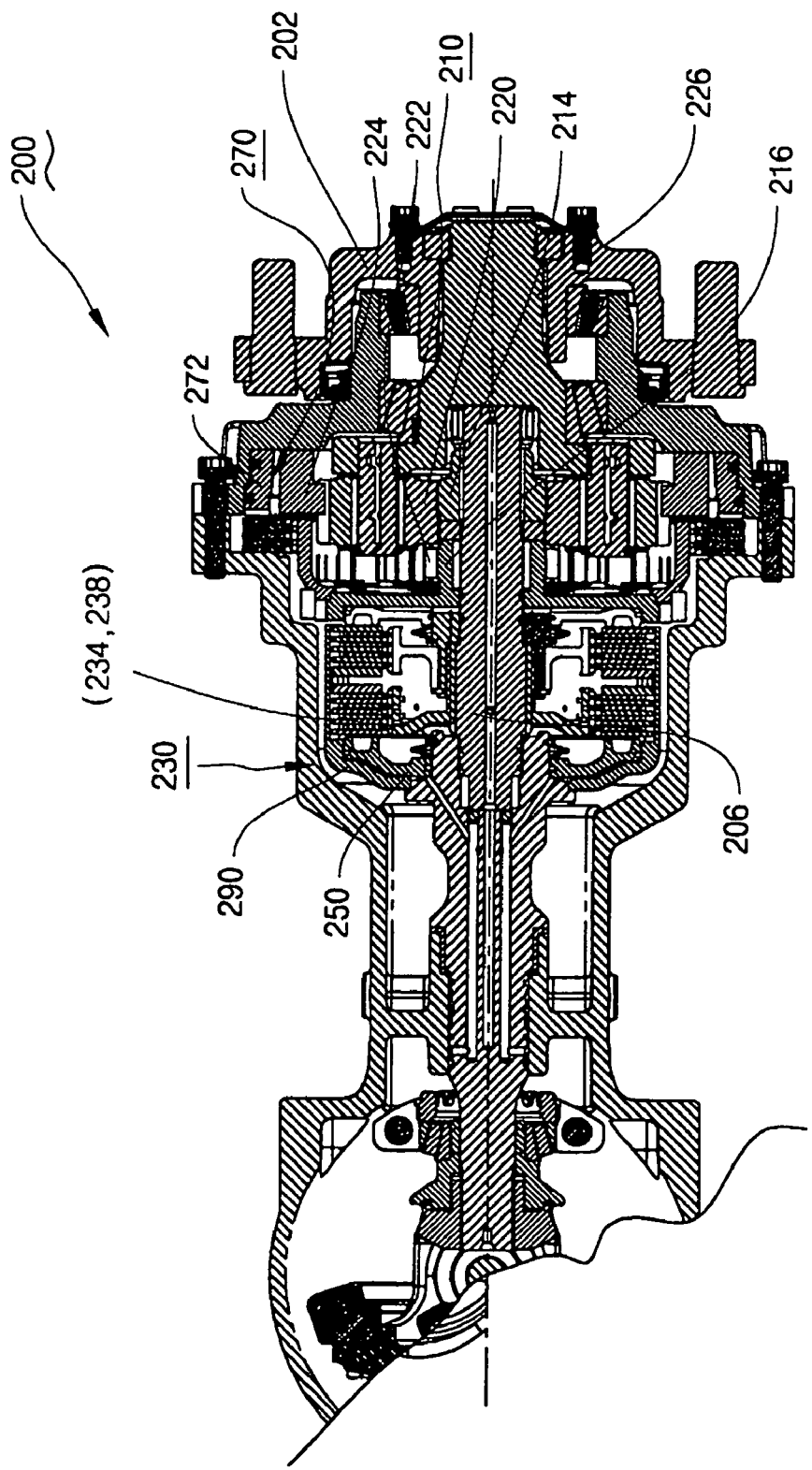
FIG. 15 is a cross-sectional view showing another embodiment of an improved wheel transmission according to the present invention, which is assembled.
Figure 16:
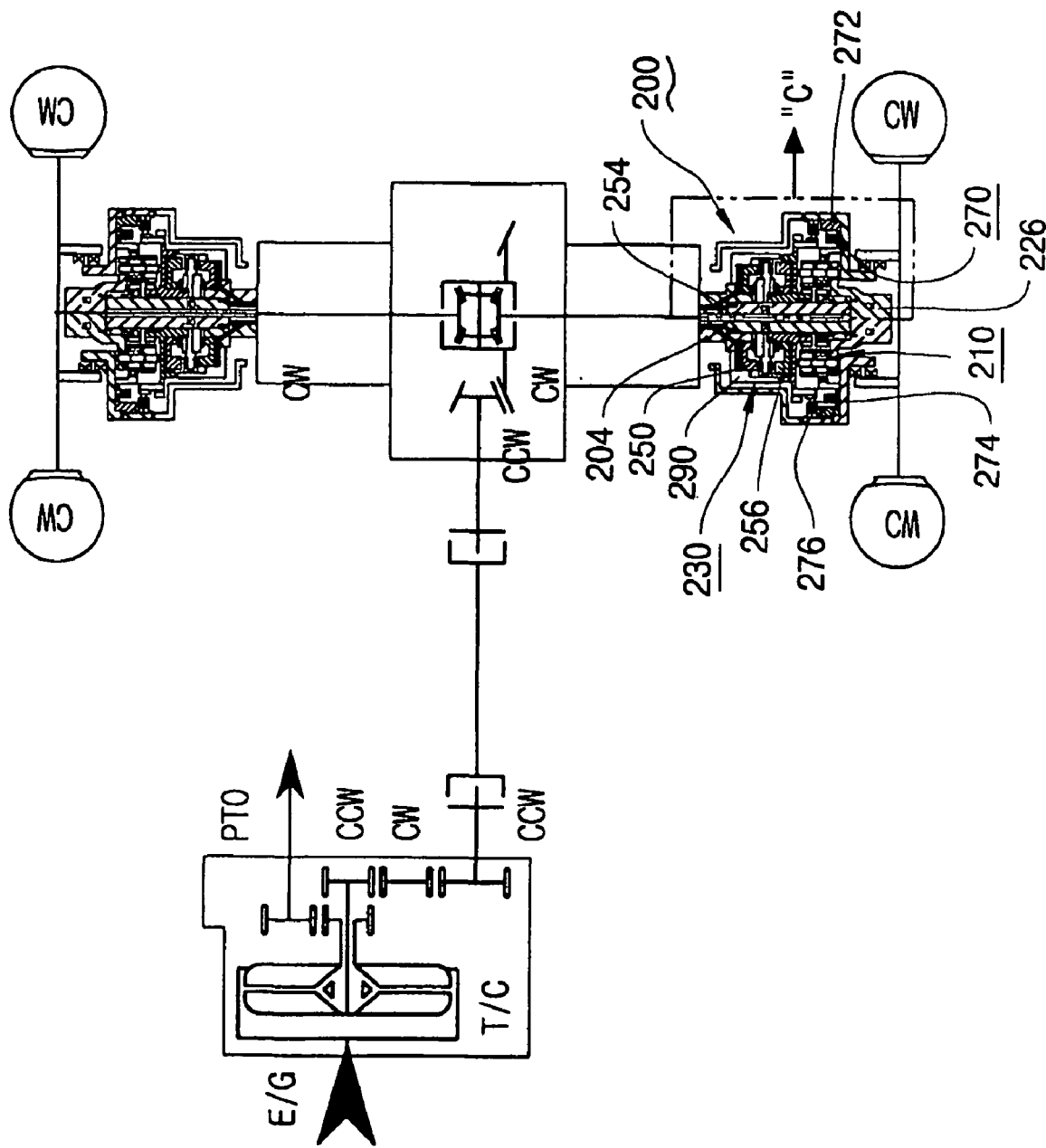
FIG. 16 is a schematic cross-sectional view of the embodiment of an improved wheel transmission according to the present invention.

FIG. 15 is a cross-sectional view showing another embodiment of an improved wheel transmission according to the present invention, and FIG. 16 is a schematic cross-sectional view of the embodiment of an improved wheel transmission according to the present invention, in which one clutch pack is provided with a forward drive clutch part together with a reverse clutch part.

Figure 17A:
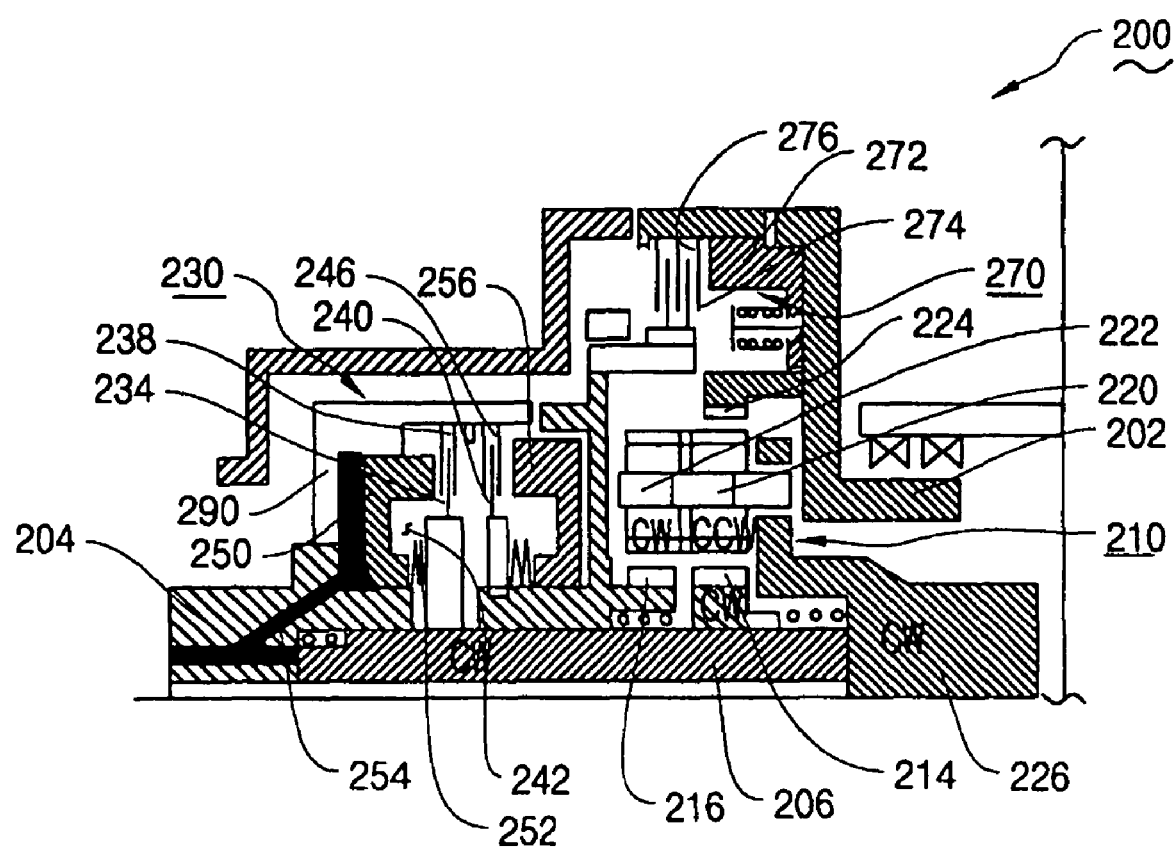
FIG. 17a is an enlarged view of "C" portion of FIG. 16 in a forward drive travel.
Figure 17B:
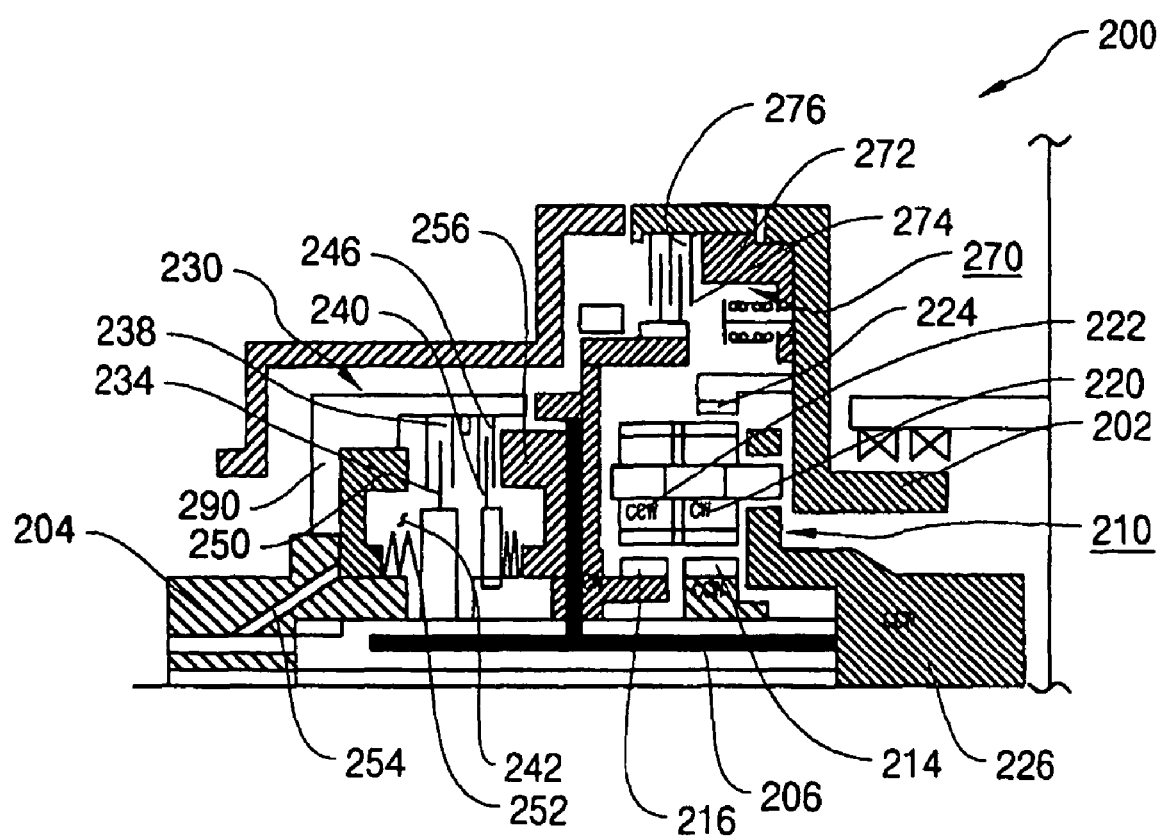
FIG. 17b is an enlarged view of "C" portion of FIG. 16 in a reverse travel.
Figure 17C:
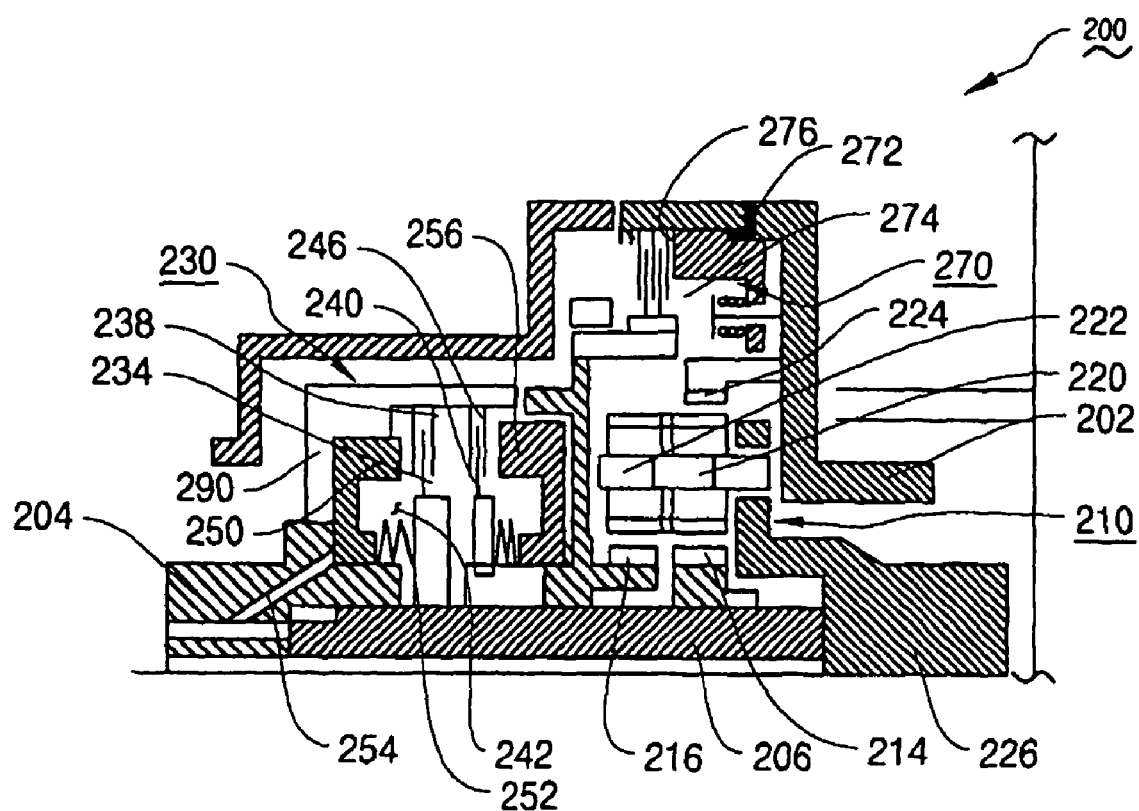
FIG. 17c is an enlarged view of "C" portion FIG. 16 when being stopped during forward drive travel.
Figure 17D:
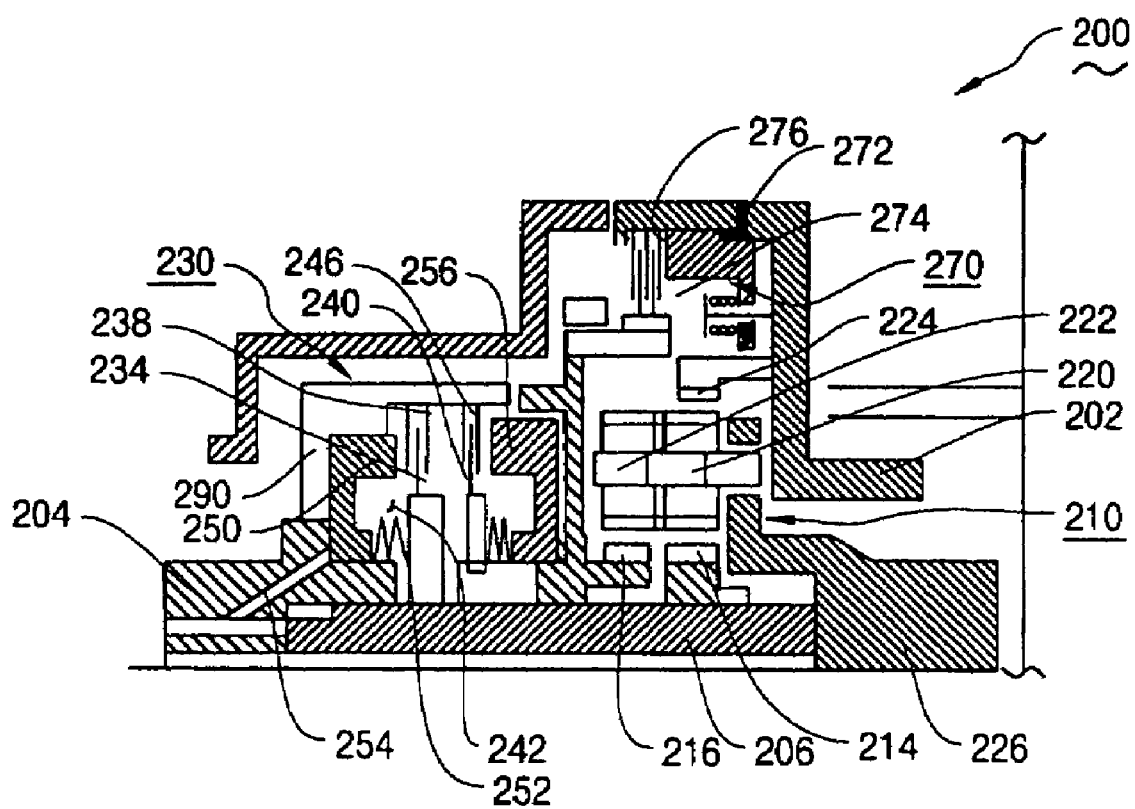
FIG. 17d is an enlarged view of "C" portion of FIG. 16 when being stopped during reverse travel.

FIG. 17a is an enlarged view of "C" portion of FIG. 16 in a forward drive travel, FIG. 17b is an enlarged view of "C" portion of FIG. 16 in a reverse travel, and FIG. 17c is an enlarged view of "C" portion FIG. 16 in state of the vehicle being stopped.

As appreciated from the drawings, in description of this embodiment of an improved wheel transmission according to the present invention, the same reference numerals as those of the above embodiment are used throughout the different drawings to designate the same or similar components, and the repeated description is omitted.

A change clutch part 230 of this embodiment comprises first clutch plates 234 coupled to a cam clutch shaft 232 rotatably mounted on the clutch shaft 206, first reaction plates 238 attached to a first clutch pack 290 extended from a drive axle shaft 204 connected to an end of the clutch shaft 206 which is adapted to be in close contact with or be separated from the first clutch plates 234 and a second clutch plate 240 disposed at a location spaced from and in parallel with the first reaction plates 238, a first cylinder part 242 adapted to push the first reaction plates 238 to be in close contact with or be separated from the first clutch plates 234, a second reaction plates 246 adapted to be in close contact with or separated from the second clutch plate 240, and a second cylinder part 248 adapted to push the second clutch plate 240 to be in close contact with or separated from the second reaction plates 246.

Where one clutch pack 290 is provided with the forward drive clutch part and the reverse clutch part, size of the wheel transmission can be reduced.

The wheel transmission of this embodiment can be configured without the one-way clutch part, and operations in forward drive and reverse travels and stopping during forward drive and reverse travels are substantially equal to those described with reference to FIGS. 9 to 12, which are shown in FIGS. 17a to 17d, respectively.

INDUSTRIAL APPLICABILITY

As described above, a wheel transmission of the present invention has advantages in that since transmissions for shifting a traveling direction are installed at axle hubs of both wheels of front wheels or rear wheels, a distance between an engine and an axle shaft can be reduced, vibration and noise generated from an engine can be intercepted, a heavy construction vehicle can be operated at a narrow site by reduction in a full length of an equipment, and since both wheels can be independently driven, it is possible to minimize a turning radius of a heavy construction vehicle; and to improve braking performance and durability by adopting a wet oiling brake, it is possible to broaden design flexibility of an engine mounting and an axle mounting by affording extra space to the center portion of a heavy construction vehicle, since rotation of an engine is finally decelerated by a gear ratio of a planetary gear assembly, it is possible to achieve a sufficient gear ratio even though a final reduction gear is reduced in size.

Also, since the wheel transmission enables a heavy construction vehicle having the transmission to be run only in one direction by means of a one-way clutch part, it is possible to prevent the vehicle from moving rearwardly when starting up in stopped state.

Furthermore, the wheel transmission according to the present invention has advantages in that since components such as a conventional transmission housing are omitted, its weight and production cost are reduced, load is relieved from hydraulic pressure in a cylinder in case of abrupt stoppage of an engine, vibration and noise generated from an engine can be interecepted, design flexibility of an axle mounting can be broadened; and since hydraulic pressure is released when an engine is stopped, it is possible to carry out an automatic braking by its own restoring force of a return spring as in a conventional wheel transmission, and since the wheel transmission has the same effect although change clutch parts are provided to one side in contrast to a conventional wheel transmission in which change clutch parts are separately provided to both sides, its design and manufacture are facilitated.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is :

1. An apparatus comprising a wheel transmission which is configured to drive each of a pair of right and left wheels of a vehicle independently and shiftable between a forward drive stage, a neutral stage and a reverse stage, wherein the wheel transmission comprises:
  a drive axle shaft operatively coupled to an engine;
  a planetary gear assembly including a forward drive sun gear and a reverse sun gear both rotatable relative to the drive axle shaft, a plurality of first planetary gears engaged with the forward drive sun gear, a plurality of second planetary gears engaged with the reverse sun gear, and a ring gear fixed to a transmission housing and engaged with the first planetary gears;
  a carrier operatively connected to corresponding one of the pair of right and left wheels and rotatably supporting the first and second planetary gears of the planetary gear assembly; and
  a change clutch part comprising a first clutch for selectively drivingly connecting the forward drive sun gear to the drive axle shaft and a second clutch for selectively drivingly connecting the reverse sun gear to the drive axle shaft.

2. The apparatus of claim 1 comprising a clutch shaft operatively connected to the drive axle shaft, the clutch shaft supports the forward drive sun gear fixedly mounted thereon and the reverse sun gear rotatably mounted thereon.

3. The apparatus of claim 1, comprising a brake part disposed in the transmission housing and provided for coupling the carrier to the transmission housing.

4. The apparatus of claim 1, wherein the planetary gear assembly and the change clutch part are disposed in the transmission housing.

5. The apparatus of claim 1, further comprising a one-way clutch part which prevents the vehicle from being moved rearwardly when the wheel transmission is in one of the forward drive stage and the neutral stage.

6. The apparatus of claim 1, wherein the first clutch includes first clutch plates coupled to a cam clutch shaft non-rotatably connected to the forward drive sun gear and first reaction plates coupled to a first clutch pack non-rotatably connected to the drive axle shaft, the first clutch plates are frictionally engageable with the first reaction plates.

7. The apparatus of claim 6, wherein the first clutch includes a first cylinder part provided for selectively engaging and disengaging the first clutch plates and the first reaction plates.

8. The apparatus of claim 7, wherein the first cylinder part comprises a forward drive piston disposed adjacent to one of the first reaction plate and the first clutch plate, a return spring disposed between the forward drive piston and the cam clutch shaft, and a first oil channel which supplies hydraulic fluid to the forward drive piston.

9. The apparatus of claim 8, wherein the first oil channel is formed through the drive axle shaft.

10. The apparatus of claim 7, wherein the second clutch includes second clutch plates coupled to the first clutch pack and second reaction plates coupled to a second clutch pack non-rotatably connected to the reverse sun gear, the second clutch plates are frictionally engageable with the second reaction plates.

11. The apparatus of claim 10, wherein the second clutch includes a second cylinder part provided for selectively engaging and disengaging the second clutch plates and the second reaction plates.

12. The apparatus of claim 11, wherein the second cylinder part comprises a reverse piston disposed adjacent to one of the second clutch plate and the second reaction plate, and a second oil channel which supplies hydraulic fluid to the reverse piston.

13. The apparatus of claim 12, wherein the second oil channel is formed through the drive axle shaft.

14. The apparatus of claim 10, wherein the second clutch plates are coupled to the first clutch pack in a direction opposite to the first reaction plates.

15. The apparatus of claim 14, comprising a brake part disposed in the housing and configured to couple the carrier to the housing.

16. The apparatus of claim 15, wherein the brake part includes brake plates coupled to the second clutch pack and frictional plates fixedly attached to the housing, the brake plates are frictionally engageable with the frictional plates.

17. The apparatus of claim 16, wherein the brake part includes a service brake piston which selectively engages and disengages the brake plates and the frictional plates, the brake plates and the frictional plates are engaged by the service brake piston displaced toward the brake plates and the frictional plates by hydraulic fluid when a brake pedal of the vehicle is depressed.

18. The apparatus of claim 17, wherein the brake part includes a spring which compresses the brake plates and the frictional plates so as to frictionally engage them when the vehicle is stopped.

19. The apparatus of claim 18, wherein the brake part includes a parking brake piston which disengage the brake plates and the frictional plates when the vehicle is running.

20. The apparatus of claim 19, wherein the brake plates and the frictional plates are disengaged by displacing the parking brake piston away from the brake plates and the frictional plates against a biasing force of the spring by hydraulic fluid.

21. The apparatus of claim 20, comprising a one-way clutch part which prevents the vehicle from being moved rearwardly when the wheel transmission is in one of the forward drive stage and the neutral stage.

22. The apparatus of claim 21, wherein the one-way clutch part comprises a one-way locker axially movable which selectively engages and disengages an outer race, a return spring which provides a restoring force which moves the one-way locker into engagement with the outer race and a cam clutch operatively coupled between the outer race and the drive axle shaft.

23. The apparatus of claim 22, wherein the one-way locker is engaged with the outer race to actuate the cam clutch when the wheel transmission is in the forward drive stage or the neutral stage, and wherein the one-way locker is disengaged from the outer race to prevent actuation of the cam clutch when the wheel transmission is in the reverse stage.

24. The apparatus of claim 22, wherein the one-way clutch part comprises a cam clutch piston axially movable by the hydraulic fluid which selectively engages and disengages the one-way locker with the outer race, and wherein hydraulic fluid is supplied through a second oil channel of the second cylinder part.

* * * * *